(12) United States Patent
Yemeni et al.

(10) Patent No.: US 7,272,855 B1
(45) Date of Patent: Sep. 18, 2007

(54) UNIFIED MONITORING AND DETECTION OF INTRUSION ATTACKS IN AN ELECTRONIC SYSTEM

(75) Inventors: Yechiam Yemeni, Fort Lee, NJ (US); Danilo Florissi, Briarcliff Manor, NY (US); Apostolos Dailianas, Xalandri (GR)

(73) Assignee: The Trustees of Columbia University in the City of New York, New York, NY (US)

( * ) Notice: Subject to any disclaimer, the term of this patent is extended or adjusted under 35 U.S.C. 154(b) by 899 days.

(21) Appl. No.: 09/589,500

(22) Filed: Jun. 7, 2000

Related U.S. Application Data

(60) Provisional application No. 60/138,150, filed on Jun. 8, 1999.

(51) Int. Cl.
  *H04L 9/32* (2006.01)
  *G06F 7/04* (2006.01)
(52) U.S. Cl. .......................................... 726/23; 705/76
(58) Field of Classification Search ................. 705/26, 705/38, 40; 455/410; 379/189, 192; 713/193, 713/153, 182; 726/27, 23
See application file for complete search history.

(56) References Cited

U.S. PATENT DOCUMENTS

| | | | |
|---|---|---|---|
| 4,321,672 A | 3/1982 | Braun et al. | |
| 5,506,961 A | 4/1996 | Carlson et al. | 726/5 |
| 5,542,046 A | 7/1996 | Carlson et al. | 726/5 |
| 5,627,886 A * | 5/1997 | Bowman | 379/111 |
| 5,815,574 A * | 9/1998 | Fortinsky | 713/153 |
| 5,913,202 A | 6/1999 | Motoyama | 705/35 |
| 5,930,777 A * | 7/1999 | Barber | 705/40 |
| 5,956,404 A | 9/1999 | Schneier et al. | 713/180 |
| 6,000,032 A | 12/1999 | Millard | |
| 6,018,723 A * | 1/2000 | Siegel et al. | 705/38 |
| 6,032,123 A | 2/2000 | Jameson | 705/8 |
| 6,078,818 A | 6/2000 | Kingdon et al. | 455/456.5 |
| 6,122,625 A | 9/2000 | Rosen | 705/65 |
| 6,157,917 A * | 12/2000 | Barber | 705/26 |
| 6,161,139 A | 12/2000 | Win et al. | 709/225 |
| 6,163,604 A * | 12/2000 | Baulier et al. | 379/189 |
| 6,182,142 B1 | 1/2001 | Win et al. | 709/229 |

(Continued)

FOREIGN PATENT DOCUMENTS

WO    WO 98/32066    7/1998

OTHER PUBLICATIONS

Kohl and Neuman, The Kerberos Network Authentication Service (V5), RFC 1510, Sep. 1993.

(Continued)

*Primary Examiner*—Ayaz Sheikh
*Assistant Examiner*—Christian LaForgia
(74) *Attorney, Agent, or Firm*—Wilmer Cutler Pickering Hale and Dorr LLP

(57) ABSTRACT

An inventive monitor monitors accesses to a resource in an electronic system, such that access to the resource is based on payments in electronic security value units. The monitor detects patterns of payments for the resource in electronic security value units, and compares the patterns of payments to predetermined patterns of payment. In addition, the monitor determines a difference in the compared patterns of payments to the predetermined patterns of payment, such that when the difference is greater than a predetermined threshold difference, an attack is indicated.

11 Claims, 9 Drawing Sheets

U.S. PATENT DOCUMENTS

| | | | |
|---|---|---|---|
| 6,232,974 B1 | 5/2001 | Horvitz et al. | 345/419 |
| 6,237,096 B1 | 5/2001 | Bisbee et al. | 713/178 |
| 6,327,352 B1 * | 12/2001 | Betts et al. | 379/189 |
| 6,338,046 B1 | 1/2002 | Saari et al. | |
| 6,339,423 B1 | 1/2002 | Sampson et al. | 715/854 |
| 6,374,300 B2 | 4/2002 | Masters | 709/229 |
| 6,389,541 B1 | 5/2002 | Patterson | |
| 6,427,140 B1 | 7/2002 | Ginter et al. | |
| 6,453,305 B1 | 9/2002 | Glassman et al. | |
| 6,473,802 B2 | 10/2002 | Masters | 709/229 |
| 6,490,601 B1 | 12/2002 | Markus et al. | 715/507 |
| 6,490,624 B1 | 12/2002 | Sampson et al. | 709/227 |
| 6,535,728 B1 * | 3/2003 | Perfit et al. | 455/410 |
| 6,542,729 B1 * | 4/2003 | Chmaytelli et al. | 455/410 |
| 6,567,511 B2 * | 5/2003 | Betts et al. | 379/192 |
| 6,594,481 B1 * | 7/2003 | Johnson et al. | 455/410 |
| 6,631,473 B2 | 10/2003 | Townsend | |
| 6,640,304 B2 * | 10/2003 | Ginter et al. | 713/193 |
| 6,643,696 B2 | 11/2003 | Davis et al. | 709/224 |
| 6,675,261 B2 | 1/2004 | Shandony | 711/121 |
| 6,704,563 B1 * | 3/2004 | Senn et al. | 455/406 |
| 6,782,379 B2 | 8/2004 | Lee | 707/12 |
| 6,816,871 B2 | 11/2004 | Lee | 707/104.1 |
| 2002/0111912 A1 | 8/2002 | Hunter et al. | |
| 2002/0133412 A1 | 9/2002 | Oliver et al. | 705/26 |

OTHER PUBLICATIONS

Needham, FL, and VL Schroeder "Using Encryption for Authentication in Large Networks of Computers," Communications of ACM, vol. 21, Dec. 1978, pp. 993-999.

Ilgun, Kemmerer, and Porras, "State Transition Analysis: A Rule-based Intrusion Detection Approach," IEEE Transactions on Software Engineering, 21(3), pp. 181-199, Mar. 1995.

Lunt, Tamaru, et al., "A Real-time Intrusion Detection Expert System (IDES) -final technical report," Technical Report, Computer Science Laboratory, SRI International, Feb. 1992.

Bellare, Garray, et al., iKP -A family of secure electronic payment Protocols, First USENIX Workshop on Electronic Commerce, pp. 89-106, Jul. 1995.

Jarecki, Odlyzko, "An Efficient Micropayment System Based on Probabilistic Polling," in Proc. of Financial Cryptography '97, R. Hirschfeld, ed., Lecture Notes in Computer Science, Springer, 1997.

Manasse, "The Millicent protocols for electronic commerce," Proceedings of the first USENIX Workshop on Electronic Commerce, Jul. 1995.

Pedersen, Electronic Payment of Small Amounts Cambridge Workshop of 1996.

Secure Electronic Transactions: Credit Card Payment on the Web in Theory and Practice, IBM International Technical Support Organization, Jun. 1997.

Sairamesh, J., D. Ferguson, and Y. Yemini An Approach to Pricing, Optimal Allocation and Quality of Service Provisioning in High-speed Packet Networks, in Proc. of the Conference on Computer Communications, Boston, Massachusetts, Apr. 1995.

Mark S. Manasse, "The Millicent Protocols for Electronic Commerce," www.usenix.org, Jul. 1995.

Stanislaw Jarecki and Andrew Odlyzko, "An Efficient Micropayment System Based on Probabilistic Polling," in Proc. of Financial Cryptography '97, R. Hirschfeld, ed., Lecture Notes in Computer Science, Springer, 1997.

Mihir Bellare, et al. "iKP—A Family of Secure Electronic Payment Protocols," USENIX Workshop on Electronic Commerce, May 8, 1995.

"Network Security. Private Communication in a PUBLIC World," Charlie Kaufman et al., Prentice Hall series in computer networking and distributed systems, 1994, pp. 177-203.

"Firewalls and Internet Security. Repelling the Wily Hacker," Second Edition, William Cheswick et al., Addison-Wesley, Reading, Mass. 1995, pp. 175-232.

Y. Yemini et al., "MarketNet: Using Virtual Currency To Protect Information Systems", 1998, European Conference on Digital Libraries, pp. 891-902.

Neuman and Ts'o, "Kerberos: An Authentication Service for Computer Networks," Sep. 1994, IEEE Communications Magazine, pp. 33-38.

Gittler and Hopkins, "The DCE Security Service," Dec. 1996, Hewlett-Packard Journal, pp. 41-48.

NIST, Special Pub 800-12-An Introduction to Computer Security: The NIST Handbook, NIST, (p. 60 and cover page).

* cited by examiner

| Issuing domain's exchange bank | Unique ID | Amount | Validity | New owner's exchange bank | Purpose | Provider | Timestamp |
|---|---|---|---|---|---|---|---|
| 62 | 63 | 64 | 65 | 66 | 67 | 68 | 69 |

| Second Association | First Association | Currency domain's exchange bank | Unique ID | Amount | Validity | New owner's exchange bank | Purpose | Provider | Time-stamp |
|---|---|---|---|---|---|---|---|---|---|
| 84 | 82 | 62 | 63 | 64 | 65 66 | | 67 | 68 | 69 |

UNIFIED MONITORING AND DETECTION OF INTRUSION ATTACKS IN AN ELECTRONIC SYSTEM

RELATED APPLICATIONS

This application is based on, and relies on the filing date of, provisional application Ser. No. 60/138,150, entitled "MARKET BASED TECHNOLOGY FOR PROTECTION OF INFORMATION SYSTEMS", filed Jun. 8, 1999 for Yechiam Yemini. The contents of this provisional application are fully incorporated herein by reference.

In addition, U.S. patent applications Ser. Nos. 09/589,496; 09/589,500; 09/589,427; and 09/589,501, respectively entitled (1) "USING ELECTRONIC SECURITY VALUE UNITS TO CONTROL ACCESS TO A RESOURCE"; (2) "UNIFIED MONITORING AND DETECTION OF INTRUSION ATTACKS IN AN ELECTRONIC SYSTEM"; (3) "IDENTIFICATION OF AN ATTACKER IN AN ELECTRONIC SYSTEM"; and (4) "A BANKING INFRASTRUCTURE FOR GENERATING AND MANAGING ACCESS RIGHTS IN AN ELECTRONIC SYSTEM", have all been filed on Jun. 7, 2000 for Yechiam Yemini, Apostolos Dailianas, and Danilo Florissi. The above four applications are assigned to the assignee of the present application. The contents of the above four applications are relevant to the subject matter of the present application and are fully incorporated herein by reference.

FIELD OF THE INVENTION

The present invention relates to system security and to a method for controlling access to a resource in an electronic system, such as a network, to prevent unauthorized access to a resource, where access to the resource is based on payments in electronic security value units. In particular, the present invention relates to monitoring accesses to the resource to determine an attack on the resource.

BACKGROUND OF THE INVENTION

If trends continue, e-commerce will continue to grow at an exponential rate every year. Protecting networked information systems and services, such as securing e-commerce transactions over wide-area networks, remains an elusive challenge of ever-growing importance and complexity. These systems and services are increasingly exposed to attacks, resulting in significant disruption of services and damages. Attackers can utilize a growing range of vulnerabilities to compromise a system or a service. Once a vulnerability is identified, an attacker can execute programs to detect further vulnerabilities and exploit them to compromise and potentially damage a large number of systems. For example, an attacker can use vulnerabilities of e-mail services or of www services to gain unauthorized access to confidential information or to transaction capabilities, potentially resulting in significant damage to the owners of these resources. As e-commerce deals with obtaining products and services in a direct exchange for a customer's money (typically by the customer's credit card), attacks on such systems are highly problematic. That is, because a customer uses his own money (e.g., in U.S. dollars) to buy a product or service (e.g., a resource) from a vendor's remote server, the vendor has little, if any, control on who accesses their resources. This will be explained in detail hereinbelow.

Examples of the types of attacks on a system include Denial of Service (DoS) attacks, identity stealing attacks, identity masquerading attacks, trojan horse attacks, runtime stack overflow attacks, and worm attacks. In a DoS attack, the attacker creates a large amount of activity that saturates a resource and prevents legitimate access to the resource. The attacker can render a service practically inaccessible to legitimate users for hours or days. In the identity stealing attacks, an attacker steals a password of another entity, such as a legitimate client, and thus obtains the equivalent accesses rights of the legitimate client. In the identity masquerading attack, the attacker successfully pretends to be a legitimate client and thus gains access to the same resources of the legitimate client. In the trojan horse attack, a resource is exploited and the attacker gains access to all services that the conquered resource can access. In the runtime stack overflow attack, an attacker opens restricted accesses by compromising a resource with a runtime stack overflow. In the worm attack, the attacker exploits a bug in a resource to plant a virus that will spread to other resources in the network.

Unfortunately, attacks are very difficult to detect because detection requires instrumentation to monitor systems and service activities, as well as to correlate this data to identify attack patterns. Current intrusion detection techniques typically provide ad-hoc instrumentation that typically requires off-line manual correlation analysis by expert security administrators. Attack detection typically occurs after an attack has been made. Often attackers manage to change logs of intrusion monitoring instrumentation to prevent such detection.

In addition, current security protection techniques are insufficient to distinguish attacks from normal activities. Moreover, even when an attack has been detected and handled, the attacker can protect its identity and evade accountability for abuses and crimes it commits. Since an attacker can remove all identifying information from attack traffic, the attacker can use a system that has been compromised to execute implanted programs to launch attacks and eliminate traces that identify the source of the attack.

As can be appreciated, several factors increase the vulnerability of networked information systems and services to attacks. First, vulnerability increases with growth in scale (i.e., the number of components involved increases the range of possible vulnerabilities and dependencies), the growth in the variety of components involved (i.e., the range of vulnerabilities), and the growth in the complexity of operations management (i.e., security issues due to specific operating configurations).

Second, rapid changes in technologies increase the vulnerability of systems and services to attackers. A change in an updated component, or in an updated configuration in an existing component, can form new insecurities that can be used by attackers. In other words, an otherwise secure system can be rendered insecure by the addition of a single component. The combinatorics of interactions between new components and existing ones increase exponentially, and with it, the possibilities of vulnerable nodes.

Third, in the absence of a unifying security architecture, it is virtually impossible for component vendors to accomplish a coordinated protection paradigm. Therefore, as stated, protection is often left to ad-hoc designs and configurations, leaving insecure networks for attackers to exploit.

Networked information systems are typically managed by domain administrators. In the absence of a unified security architecture, domain administrators face increasing exposure to security risks and, further, they are unable to control, bound, or even quantify this exposure. Domain administrators require expensive expert manual labor to monitor and correlate access anomalies in order to detect an attack. Further, as stated above, such monitoring is typically accomplished through off-line non-realtime processes completed hours or days after the attack has been completed, giving sufficient time for an attacker to have possibly eliminated its traces.

A significant body of research and implementation work has been devoted to protecting individual resources or whole network domains. Two of the most commonly used protection techniques are (1) firewalls/security gateways (see, e.g., Cheswick, and Bellovin, "Firewalls and Internet Security: Repelling the Wily Hacker," Addison-Wesley, Reading, Mass. 1994), and (2) a combination of authentication and access control lists (see, e.g., Kaufman, Perlman, and Speciner, "Network Security—Private Communication in a Public World," Prentice Hall series in computer networking and distributed systems, 1995; Kohl and Neuman, "The Kerberos® Network Authentication Service (V5)," RFC 1510, September 1993; Needham, F L, and V L Schroeder. "Using Encryption for Authentication in Large Networks of Computers," Communications of ACM, Vol. 21, December 1978, pp. 993-999; and Needham and Schroeder, "Authentication Revisited," Operating Systems Review, Vol. 21 # 1, January 1987).

Firewalls are typically computers that are positioned between an internal network and the external environment, which filter the data packets being received or transmitted, according to various criteria. Firewalls also provide proxying of internal services, such as e-mail and domain name systems (DNS), to outside accesses in order to reduce the exposure of these services to attacks. However, firewalls (or other security gateways) have the disadvantage of offering only limited security. In addition, they slow down the system operation and require complex configuration management to support access to new applications.

Authentication mechanisms, such as the well-known Kerberos® authentication mechanism, can verify the identity of network entities involved in a transaction. This verification is typically achieved through a certificate generated by a trusted certification authority. Certificates are valid for a period of time during which they authenticate the identities of the entities involved in a transaction. In the Kerberos® authentication mechanism, "tickets," which are issued as part of the authentication between an entity and a resource it wishes to access, provide the entity with unlimited access to the resource during the validity of the ticket.

Access control lists (ACLs) determine the authorization of the entity to access the specific resource. An ACL is associated with each resource whose access needs to be restricted. However, ACLs become prohibitively expensive as they increase in size, since they become expensive to store, difficult to maintain, and provide relatively little assistance in isolating attack sources, once the source or sources of an attack have been identified.

Another commonly used protection system is known as an intrusion detection system, which can be classified in two main categories:

(a) misuse detection systems, which attempt to identify intrusions by monitoring systems to identify patterns of well-known attacks (see, e.g., Ilgun, Kemmerer, and Porras, "State Transition Analysis: A Rule-based Intrusion Detection Approach," IEEE Transactions on Software Engineering, 21(3), pp. 181-199, March 1995); and (b) anomaly detection systems, which attempt to distinguish between normal and abnormal access patterns (see, e.g., Lunt, Tamaru, et al., "A Real-time Intrusion Detection Expert System (IDES)—final technical report," Technical Report, Computer Science Laboratory, SRI International, February 1992).

Many intrusion detection systems currently involve manual ad-hoc solutions; that is, they rely on the experience of the protection system creators to invent thresholds for differentiating normal from abnormal behavior, and employ hand-coded intrusion patterns in the attempt to identify intrusions. These practices limit the effectiveness and applicability of such intrusion detection systems to future unpredictable attacks. Furthermore, most intrusion detection systems are resource specific, which imposes restrictions on the correlation of events for detecting abnormal access patterns.

Over the past decade, significant research has been performed in the area of e-commerce, resulting in the development of several electronic payment protocols with respective financial institutions, for securing transactions over wide-area networks (see, e.g., Bellare, Garray, et al., "iKP-A family of secure electronic payment Protocols," First USENIX Workshop on Electronic Commerce, pp. 89-106, July 1995; Chaum, Fiat, and Naor, "Untraceable Electronic Cash," Advances in cryptology-EUROCRYPT '92 Proceedings, Springer-Verlag, 1990, pp. 319-327; Jarecki, Odlyzko, "An Efficient Micropayment System Based on Probabilistic Polling," in Proc. of Financial Cryptography '97, R. Hirschfeld, ed., Lecture Notes in Computer Science, Springer, 1997; Manasse, "The Millicent protocols for electronic commerce,"Proceedings of the first USENIX Workshop on Electronic Commerce, July 1995; Okamoto, Ohta "Universal Electronic Cash," Advances in Cryptography, CRYPTO'91 Proceedings, Springer-Verlag, 1992, pp. 324-337; Pedersen, "Electronic Payment of Small Amounts" Cambridge Workshop of 1996; Schneier, B. "Applied Cryptography," second edition, John Wiley & Sons, pp. 139-147; "Secure Electronic Transactions: Credit Card Payment on the Web in Theory and Practice," IBM International Technical Support Organization, June 1997).

However, current financial institutions associated with e-commerce do not address certain key issues. For example, the issues of scalability and transparency are not addressed. Rather, most of their work research focuses on centralized infrastructure particular to the associated payment protocol. A second issue not addressed is the protection of the online financial infrastructure itself from intruders (i.e., from attackers). Furthermore, the volume of transactions created by trading both physical resources and higher level services is orders of magnitude larger than that assumed by typical e-cash protocols. Therefore, it becomes imperative to develop protocols with very low overheads in terms of: bandwidth; information that needs to be stored; and the cost of payment functionality.

Economic-based mechanisms for network resource management have focused on the efficient allocation of resources through the application of economics-based principles, and have provided insights on the role of prices and the operation of markets in a distributed network economy. See, for example, Kurose, J., M. Schwartz, and Y. Yemini "A Microeconomic Approach to Optimization of Channel Access Policies in Multiaccess Networks," Proc. of the 5th International Conference on Distributed Computer Systems, Denver, Colo., 1995; Sairamesh, J., D. Ferguson, and Y. Yemini "An Approach to Pricing, Optimal Allocation and Quality of Service Provisioning in High-speed Packet Networks," in Proc. of the Conference on Computer Communications, Boston, Mass., April 1995; and Y. Yemini "Selfish Optimization in Computer Networks," Proc. of the 20th IEEE Conference on Decision and Control, pp. 281-285, San Diego, Calif., December 1981., each of which is fully incorporated by reference. Such network resource management paradigms can be applied to the creation of a market system for trading access rights to resources, and for controlling prices as a means of achieving access control and protection of resources. However, the above-described electronic payment protocols and economic based mechanisms for network resource management have not been applied to enhancing network security and protecting network resources from unwanted intrusions or attacks.

It is an object of the invention to overcome the deficiencies in the prior art. In particular, the present invention provides a unique approach to enhancing the security of an electronic system, such as a network, and protecting against unauthorized access to resources of the electronic system. The present invention, inter alia, provides a novel method and system which uses electronic security value units (i.e., a form of electronic security value "currency") to prevent unauthorized access to resources and services (collectively, "resources") in the electronic system by components of the system.

SUMMARY OF THE INVENTION (1) Using Electronic Security Value Units to Control Access to a Resource Overview In an illustrative embodiment of the invention, enhanced protection is provided in order to prevent unauthorized access to resources in an electronic system, such as a network. A component of the system, such as a client, is allowed access to a resource only in exchange for payment of an appropriate amount of a resource-specific electronic security value unit or currency. For example, to receive access rights, payment from the client is transferred to a resource manager managing the resource. For example, a www browser software needs to pay a www server to access its pages.

Prices are set by the resource manager, acting on behalf of the resources it protects. A client or a client manager, acting on behalf of the client, learns the prices and the currency accepted by a particular resource manager, either by querying the resource manager directly or by obtaining this information through a price directory where the resource manager advertises this information. The resource manager provides clients with access to a resource if the requirements of pricing and access strategy established by the resource manager for the resource have been met.

In accordance with an embodiment of this aspect of the present invention, a network utilizes electronic security value units to prevent unauthorized access to resources in the network. The network includes at least a resource manager and an electronic bank server (e.g., the local resource bank). The resource manager determines a pricing strategy in electronic security value units for a group of one or more resources in the network. The electronic bank server selectively distributes electronic security value units to one or more clients in the network, where the electronic security value units are unique to a group of one or more resources (such a group also being referred to as a currency domain). Accordingly, access to a resource in the group, by a particular client, is determined by at least the above pricing strategy and by an amount of electronic security value units distributed to the particular client.

For example, the resource manager denies the client access to a particular resource when the client possesses an amount of electronic security value units less than the price established for the particular resource.

As a further aspect of this illustrative embodiment, to enhance control over access to the resource, the local bank server selectively distributes electronic security value units after the bank determines (a) whether or not to distribute any electronic security value units to the client, (b) the amount of electronic security value units to distribute to the client, and (c) which particular group of one or more resources the client can access.

As an additional aspect of this embodiment, the resource manager may budget a client and thus further control the client's access to a resource. The resource manager may limit the number of accesses the client may have to the resource, regardless of the amount of said electronic security value units distributed to said client.

In another illustrative embodiment of the invention, the syntax of an electronic security value instrument is described, and includes at least first and second fields. The first field may indicate a quantity of electronic security value units in the instrument. The second field may indicate a group of one or more resources with which the electronic security value instrument is associated. The electronic security value instrument is used to control access by components (e.g., by clients) to resources in the group of resources, based on prices in electronic security value units established for the resources and the quantities of electronic security value units paid by the components.

As an aspect of this embodiment, the electronic security value instrument further includes third and fourth fields. The third field may indicate an identifier of the electronic security value instrument. The fourth field may indicate a specific resource in the group of one or more resources that the particular component may access.

In another embodiment, electronic security value instruments or units are used to protect access by components to internal computer system resources. For example, a Java® program executing over a Java® Virtual Machine (JVM) is required to pass payments, in electronic security value units, for its usage of CPU time, memory, special application program interfaces (API) provided by the JVM, and access to operating system (OS) resources. The security value instrument is represented by a data structure that is passed to a manager of the JVM who authorizes access and collects payments for these accesses. The resource manager handles access control through pricing and payment.

In short, the above embodiments provide a novel electronic system and method for protecting electronic systems which uses electronic security value units to prevent unauthorized access to resources, so as to enhance network security.

(2) Unified Monitoring and Detection of Intrusion Attacks in an Electronic System Overview In an illustrative embodiment of the present invention, to limit the adverse affects of an attack, anomalous behaviors, caused by one or more intruders accessing a resource of the electronic system, is detected by a monitoring mechanism. Each domain in the network may include a monitor, such as an intrusion detection monitor (IDM).

Each domain may include an IDM which is preferably implemented in a software server. The functions of the IDM includes examining and auditing the flow of currency through respective bank servers or resource managers. In addition, the IDM monitors patterns of spending or payments (of electronic security value units) in real-time, to determine whether an attack has occurred.

For example, "pattern of payments" from a client are monitored in one aspect of the present invention, while "pattern of payments" to a resource are monitored in a second aspect. In the first aspect, the IDM monitors the local bank server of a client to determine a pattern of payments from the client to all resources or to any specific resource in the IDM's domain. Next, the IDM compares the monitored pattern of payments with a predetermined pattern of payments to determine whether the difference is greater than a predetermined difference. If the difference is greater than the predetermined difference, then the IDM determines that the monitored client is a potential attacker. Subsequently, the IDM analyzes the potential attacker's specific accesses and alerts security administrators to the potential attack.

Further, in the second aspect, the IDM monitors the resource manager or the local bank of the monitored resource to determine a pattern of payments received by the resource from all clients in any domain. Next, the IDM compares the monitored pattern of payments with a predetermined pattern of payments to determine whether the difference is greater than a predetermined difference. If the difference is greater than the predetermined difference, then the IDM determines that a potential attack has occurred. Subsequently, the IDM analyzes the potential attacker's specific accesses and alerts security administrators to the potential attack.

In an additional embodiment of the invention, an inventive monitor monitors accesses to a resource in an electronic system, the accesses to the resource being based on payments in electronic security value units. The monitor detects patterns of payments for the resource in electronic security value units, and compares the patterns of payments to predetermined patterns of payment. In addition, the monitor determines a difference in the compared patterns of payments to the predetermined patterns of payment, such that when the difference is greater than a predetermined threshold difference, an attack is indicated.

In a further embodiment of the invention, a security monitoring and measurement system monitors accesses to a set of resources in an electronic system. The monitor maintains a budget for each accessing client and a price for each resource in a group of resources. The monitor deducts from the budget of a client the respective price for each access to a resource. When the budget of a client is depleted, the monitor can alert security personnel to potential exposure of attacks by the client, or activates filters that prevent further accesses by the client.

In short, the above embodiments detect anomalous behavior by one or more intruders in accessing a resource of a network to limit the effects of an attack by examining patterns of expenditures of electronic security value units in particular time periods. In particular, the above embodiments provide a unified mechanism, measuring access behaviors using electronic security value units, to detect anomalies generated by attacks, regardless of the specific operational details of the clients or resources.

(3) Quantifying the Risk and Limiting Exposure to Attacks in an Electronic System Overview In an illustrative embodiment of the present invention, electronic security value units are used to quantify and limit the power of a potential attacker and the exposure of resources. A domain in a network first mints its own electronic security value units, to be used by client domains or individual components to access its resources. The domain then sets prices, in security value units, for accessing each of its resources. Resources that require higher level of protection are assigned higher prices to limit the range of clients who may be able to access them. The domain then distributes limited budgets, in these security value units, to client domains and components. These budgets may reflect the level of security classification, or trust, that the domain has in these client domains or components. For example, the domain can allocate high budgets to its system administrator accounts, while limiting the budget allocated to client domains that present high risk of attacks.

Once prices and budgets have been established, the domain can compute the number of accesses possible to each group of one or more of its resources by each group of one or more of these client domains or one or more components, thus obtaining a strict quantifiable measure of exposure of any of its resources or group of resources to attacks by any of these client domains or components, or any group of such client domains or components. The total budget, available to any group of client domains and components, determines a quantified measure and limits the exposure to potential attacks from any entity in the group. The price of a resource, or a group of resources, determines a quantified measure of the level of exposure to potential attacks.

As another aspect of this embodiment, the domain can tune prices and budgets dynamically to control, in a fully quantified way, the level of exposure to attack on each of its resources by each of its client domains or components. For example, when a new method of attack is detected, the prices of the respective resources used in the attack can be immediately raised to prevent exposure to such attacks. Similarly, when a given client domain is known to present security hazards, its budget can be immediately reduced to limit the exposure to potential attacks by this client domain. For example, a network domain may respond to a so-called denial of service (DoS) attack on its resources by raising the prices of the resources under attack and by reducing the budgets of domains participating in the attack.

In another embodiment of the present invention, the domain consists of a computer system that mints and distributes electronic security value units, and sets prices for accessing its resources, to quantify and limit exposure to potential attacks. For example, an Operating System (OS) may set high prices for critical resources that may be used to compromise it, and may strictly limit the budgets allocated to application programs, or their users, to create a quantified assured bound on its exposure to potential attacks. For example, the OS can accomplish quantification of its exposure to stack overflow attacks by setting an increasing price for physical memory usage by the run time stack, when it reaches near the bounds allocated to a program.

In a particular illustrative embodiment of the invention, the measure of exposure to an attack on, e.g., a resource in an electronic system, can be quantified and controlled. Similarly, the measure of attack power of, e.g., one or more components in an electronic system, can be quantified and controlled. In particular, a price set for a resource is determined in electronic security value units. This is illustratively done by the resource or resource manager. Next, a budget, also in electronic security value units, is determined by, e.g. a domain or resource manager, and distributed to one or more components, such as to a client.

A measure of exposure to attacks of the resource, as well as a measure of attack power by the components can then be determined, based on the determined price and on the budget. In addition, access to the resource is controllable, based on either or both of the above measures.

In short, the risk of exposure of attacks of a resource, as well as the attack power of a component are measurable. Therefore, a component can be denied access to the resource when either measure is above a predetermined threshold. Accordingly, the resource is protected against attacks.

(4) Identification of an Attacker in an Electronic System Overview

In an illustrative embodiment of the invention, the identity of any client can be determined, and undeniable proof of the client's access to a resource can be provided, anytime after payment for a resource has been made from the client to the resource. This provides liability of clients for accesses to resources they perform in an electronic system.

As an example, assume that a client requests electronic security value units of a resource to obtain access rights to the resource. When the resource's electronic security value units are distributed to the client, through a system of electronic banks, a first association is recorded, linking the client with the distributed resource electronic security value units. At this point, assume that the client transmits a payment, in the resource electronic security value units, to the resource, and is granted the right to access the resource. When this payment occurs, a second association is recorded, linking the particular payment to the particular access. At any point thereafter, the identity of the client can be determined. This is done by first analyzing the recorded second association to determine which electronic security value units were used to access the resource. Once the actual electronic security value units used by the client are determined, the first association of the actual electronic security value units is analyzed. This first association indicates the client. Therefore, using this powerful feature of the present invention, the attacker is identified and linked to the particular attack.

In an additional embodiment of this invention, the steps of recording the first and second associations and the analysis to determine the identity of the attacker are provided by an independent party, that validates both associations to produce a proof of an attacker's identity. This enables enforcement of liability on attackers.

Further, in another illustrative embodiment of the present invention, protection is offered to eliminate the possibility of attackers reusing electronic security value units that have already been paid to access a resource. For example, once a payment of electronic security value units is made to a resource and then deposited by the resource to an associated bank, the electronic security value units, unlike in traditional money, are destroyed or "cleared." Accordingly, the electronic security value units can not be reused. However, although the actual electronic security value units are cleared, all of the identification and liability information is permanently stored in the associated bank.

As indicated by the above examples, by associating particular electronic security value units with particular clients and with particular accesses, it is possible to keep track of which particular clients are responsible for any particular access.

(5) Banking Infrastructure for Generating and Managing Access Rights in an Electronic System Overview In accordance with an illustrative embodiment of the invention, an electronic banking infrastructure is provided to enhance security of the electronic security value unit based electronic system. The banking infrastructure in the present invention is distributed and hierarchical. For example, different banks in different levels of the hierarchy perform different functions.

The banks at the root of the hierarchy, the mint or central banks, produce electronic security value units (i.e., currency) for various currency domains (or simply, domains or groups of one or more resources and/or clients). Cryptographic techniques provide assurances that currency cannot be forged or duplicated and illegally used more than once. Therefore, in this illustrative embodiment of the invention, the mint banks are the only entities that can produce valid currencies. The banks at the next level in the hierarchy, the exchange banks, perform exchange of currencies, with other exchange banks, subject to a currency distribution policy of the domain they represent. A distribution policy includes, for example, a maximum total budget for all domains, a maximum budget for any specific domain, a maximum total rate of the electronic currency outflow, and a maximum rate of the electronic currency outflow to any specific said domain.

In addition, exchange banks place their unique signature on the currency, produced on the behalf of a requesting exchange bank, which provides some level of guarantee, so that even if an attacker manages to conquer (i.e., successfully attack) the mint bank, the attacker does not gain access to a currency that the attacker can use. The third level of banks, the domain banks, are responsible for enforcing the currency distribution policies (also known as dissipation policies) of the domains they serve, but they do not perform currency exchanges. In an illustrative embodiment of the invention, the mint banks, exchange banks, and domain banks are implemented as software servers, running, e.g., C++ software.

The banks at all levels also perform accounting and provide auditing for transactions or currency flow. Enforcement of distribution policies by domain banks guarantees that the effects of conquering any part of the banking infrastructure are localized and do not propagate to other domains. An attacker needs to acquire the currency accepted by a domain in order to access its resources. Even if the attacker conquers the exchange bank for, say domain X, or even manages to get or produce an infinite amount of domain X currency (i.e., domain X electronic security value units), the attacker cannot damage domain Y, since domain Y's banks control the exchange of currency. In other word, if the attacker attempts to use currency X to access a resource in domain Y, the attacker exchanges currency X to currency Y. As stated, the exchange bank of domain Y can simply refuse to exchange currency or severely limit the amounts Y currency the attacker can acquire.

The banks, further, can directly audit the balances of accounts maintained by other banks, resource managers or clients, in their subordinated hierarchy. They can compare these accounts and summarize them to detect possible misuse of funds by a subordinate bank. As an example, assume that an attacker conquers a bank and misuses the balances of accounts in this bank by appropriating funds, belonging to others, to finance attacks. This will cause inconsistencies between the accounting maintained by the entities whose electronic security value units were used by the attacker and the accounts in banks of resource managers and domains to which such access was gained. These accounting inconsistencies can be used to isolate the bank that has been compromised and neutralize its currency until the attack has been cleared.

In accordance with an embodiment of this aspect of the present invention, an electronic banking infrastructure supports the use of electronic security value units to control access to resources in an electronic system. For example, the access to the resources depend on a pricing policy for each resource, established in electronic security value units, and depend on payments in electronic security value units, by components in said system to access to the resources. The infrastructure includes one or more electronic banks to create the electronic security value units, to maintain accounts measured in electronic security value units for individual components in the system, and to engage in transactions involving the transfer of the electronic security value units into and out of the accounts, wherein one or more electronic banks maintain auditable recorded logs of the transactions.

Further, the banks manage and enforce liability in the transfer of electronic security value units among them or between banks and components (e.g., clients) in the electronic system. Whenever a bank transfers security value units to another bank or to a component, it creates and records an association that transfers liability to the recipient of the electronic security value units.

In short, the above embodiments provide a novel electronic banking infrastructure for protecting access to resources in a network, and thereby enhancing network security.

BRIEF DESCRIPTION OF THE DRAWINGS

The following detailed description, given by way of example and not intended to limit the present invention solely thereto, will best be understood in conjunction with the accompanying drawings, where similar elements will be represented by the same reference symbol, in which.

DETAILED DESCRIPTION OF THE INVENTION

I. General Overview

As indicated above, the present invention describes a system in which electronic security value units (i.e, currency) are used to control access to resources in an electronic system, such as a network or a stand-alone computer. In the case of a network, components, such as clients or users, are attached to the network.

Section II below is an overview of the use of the electronic security value units, hereinafter referred to as electronic security value units, and the advantages that can be achieved by using such electronic security value units to enhance network security.

Section III, below, describes a Resource Access Layer (RAL) which is a distributed software system used to implement the electronic security value units based technique for enhancing resource security. Further, Section III includes a detailed example that show how such electronic security value units are used to enhance security in an electronic system, such as a network.

Section IV, below, describes how attacks can be detected, e.g., by monitoring payments of electronic security value units.

Section V, below, describes how the electronic security value units can be used to quantify the risk and exposure to attacks to particular resources.

Section VI, below, describes how to identify any user, such as an attacker, who has accessed a resource.

Section VII, below, describes an electronic banking infrastructure, that is implemented with a particular embodiment of the Resource Access Layer (RAL), to achieve the distribution, accounting, and auditing of the electronic security value units.

Section VIII, below, is a conclusion.

II. Overview of the Use of Electronic Security Value Units to Enhance Security

Figure 1:
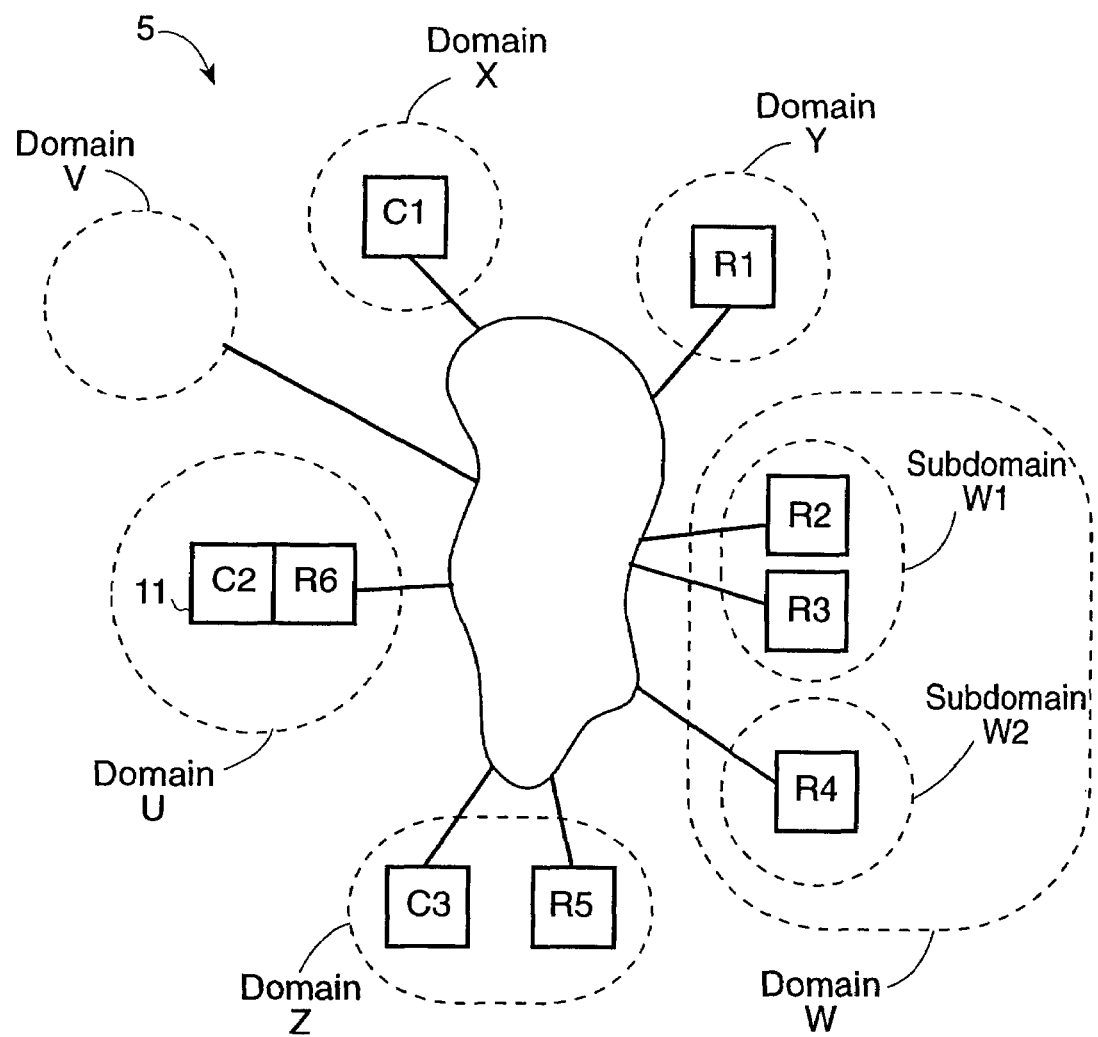
FIG. 1 schematically illustrates an electronic system in the form of a network

In accordance with an illustrative embodiment of the present invention, FIG. 1 schematically illustrates an electronic system in the form of a network 5. Other examples of electronic systems include, e.g., a stand-alone computer and wireless systems. The network 5 includes multiple resources, which are designated R1, R2, R3, R4, R5 and R6. Of course, any number of resources may be attached to network 5. Examples of resources include: CPU time, bandwidth in a network, access to a server for running an application or using a service, access to a server for using an e-commerce site, accessing information in an on-line database system, etc. Each resource may be configured, e.g., as a software or hardware server.

The network 5 of FIG. 1 further includes multiple components, such as clients or users, hereinafter "clients," who may desire access to any or all resources R1-R6. These multiple clients are designated client C1, client C2, and client C3. As with resources, any number of clients may be attached to network 5 and clients may be configured as hardware or software. Examples of clients include a user having a computer attached to network 5, and a user having a wireless device, such as a web-enabled personal digital assistant (PDA), attached to a wireless system. In addition, as shown in FIG. 1, a resource and a client may be in the same physical computer. Such an example is illustrated in computer 11. Illustratively, computer 11 includes a resource, designated R6 and a client, designated C5.

Further, as shown in FIG. 1, clients and resources can be separated into multiple domains. These multiple domains are designated domain U, domain V, domain W, domain X, domain Y, and domain Z. Domains X and Y include client C1 and resource R1, respectively. Domain U includes computer 11 having client C2 and resource R6 residing therein. Domain Z includes both client C3 and resource R5, but unlike domain U, the client and resource are separate from one another. Lastly, domain W includes resources R2, R3, and R4. However, domain W is divided into subdomains W1 and W2, where subdomain W1 includes resources R2 and R3, and subdomain W2 includes resource R4. Currency domains and subdomains will be described in greater detail below; however, for now, note that in an illustrative embodiment of the invention, each domain and each subdomain has its own unique electronic security value units that is required to access its respective resources. In alternative embodiments, this may not be the case, i.e., a domain and its subdomain may share the said electronic security value units.

In short, clients wish to gain access to the resources in the network of FIG. 1. In general, it is important to control access of the clients to the resources to prevent unwarranted attacks on the resources.

Examples of the types of attacks which can be mounted include Denial of Service (DoS) attacks, identity stealing attacks, identity masquerading attacks, trojan horse attacks, runtime stack overflow attacks, and worm attacks. In the DoS attack, the attacker creates a large amount of activity that saturates a given resource and prevents legitimate access to the resource. In the identity stealing attacks, an attacker steals a password of another entity, such as a legitimate client, and thus obtains the equivalent accesses rights of the legitimate client. In the identity masquerading attack, the attacker successfully pretends to be a legitimate client and thus gains access to the same resources of the legitimate client. In the trojan horse attack, a resource is exploited and the attacker gains access to all services that the conquered resource can access. In the runtime stack overflow attack, an attacker opens restricted accesses by compromising a resource with a runtime stack overflow. As a final example, in the worm attack, the attacker exploits a bug in a resource to plant a virus that will spread to other resources in the network.

Accordingly, a further purpose of the invention is to provide new techniques for controlling access by the clients to the resources and to detect and prevent unwarranted attacks and intrusions.

In accordance with the invention, a new technique is provided to achieve enhanced protection for the resources in the network 5. Such enhanced protection is achieved by allowing a particular client access to a particular resource only in exchange for a payment of an appropriate amount of specific electronic security value units. The electronic security value units may be viewed as a type of currency which is used to pay for access from a security point of view. It is believed that the use of security value units to achieve enhanced security is a unique aspect of the invention not heretofore disclosed.

To understand how electronic security value units work, it is useful to consider a simple example. Referring to FIG. 1, assume that client C1 in domain X wants to access resource R1 in domain Y. Assume also that client C1 in domain X possesses a first type of electronics security value units (e.g., X currency) and that resource R1 has adopted a pricing and access strategy that requires a payment in a second type of electronic security value unit (e.g., Y currency) to access resource R1. In order for client C1 to gain access to resource R1, client C1 must first acquire Y currency. Accordingly, through a system of electronic banks (not shown in FIG. 1), client C1 acquires an amount of Y currency in exchange for an amount of its X currency. In an illustrative embodiment of the present invention, the amount of Y currency that client C1 receives has an equal value to the amount of X currency that client C1 exchanged. The resource R1 can control the amount of Y currency that client C1 acquires (i.e., control client C1's budget of Y currency), or even prevent client C1 from acquiring any Y currency. Assuming, however, that client C1 can acquire the Y currency, client C1 can then access the resource R1 based on the pricing strategy set for resource R1 and the budget of Y currency available to client C1.

One can immediately appreciate that certain protective measures for resource R1 are built into the use of the Y currency or electronic security value units. For example, resource R1 can deny the Y currency to client C1, thereby denying client C1 access to resource R1. Further, resource R1 can allow client C1 to acquire a limited budget of Y currency, thereby limiting the access of client C1 to resource R1.

Moreover, there are other advantages to this type that result from the use of electronic security value units. For example, in an illustrative embodiment of the present invention, it is possible to analyze patterns of spending or payments (of electronic security value units) in real-time to determine whether an attack has occurred. Such patterns of payments can be analyzed in one of two ways. In the first, patterns of payments expended from a client are analyzed. That is, a monitor, such as an intrusion detection monitor (described in detail in Section IV) analyzes the client. In the second, patterns of payments received at a resource are analyzed. That is, the monitor analyzes the resource. Such patterns of payments can then be compared to predetermined patterns of payments. A large difference between a monitored pattern and a predetermined pattern may indicate an attack.

In addition, in another illustrative embodiment of the present invention, the identity of any client can be determined anytime after payment for a resource has been made from the client to the resource. This feature is particularly useful to identify a client or group of clients that has misbehaved or to identify a client or group of clients that has attacked a resource.

As an example, assume that a client requests electronic security value units of a resource to obtain access rights to the resource. When the resource electronic security value units are distributed to the client, through a system of electronic banks (to be described in detail below), a first association is recorded, linking the client with the distributed resource electronic security value units. At this point, assume that the client transmits a payment, in the resource electronic security value units, to the resource, and is granted the right to access the resource. When this payment occurs, a second association is recorded, linking the particular payment to the particular access. At any point thereafter, the identity of the client can be determined. This is done by first analyzing the recorded second association to determine which electronic security value units were used to access the resource. Once the actual electronic security value units used by the client are determined, the first association of the actual electronic security value units is analyzed. This first association indicates the client. Therefore, using this powerful feature of the present invention, the attacker is identified.

Further, in another illustrative embodiment of the present invention, the electronic security value units provide protection against a misbehaving entity, such as an attacker, from duplicating and reusing electronic security value units. For example, an attacker can "illegally" reuse electronic security value units that have already been used in one of the following ways. First, a client manager may illegally attempt to double-spend the electronic security value units (or bill). Second, the resource manager receiving a bill as payment for accessing a resource, or any entity that received the bill, attempts to double deposit the bill. Third, a "man-in-the middle" steals the bill in transit (e.g., when it is transmitted between the client and resource managers for payment), and uses it for some other purpose. The first and second illegal reuses, i.e., the double-spending and double-depositing, is prevented because a duplicated bill is easily detected due to an unique ID, illustratively included in a field of the bill. The third illegal reuse, i.e., the man-in-the-middle theft, is protectible due to a second unique association (associates the bill with the particular request to access a resource), which may be included in a field or the bill, or stored with, e.g., the client manager or elsewhere in the RAL.

As indicated by the above examples, by associating particular electronic security value units with particular clients, it is possible to keep track of which particular clients are responsible for any particular access.

III. Using Electronic Security Value Units to Control Access to a Resource

A. The Resource Access Layer

In an illustrative embodiment of the present invention, in order to implement a security system based on electronic security value units for resources in an electronic system, such as a network, a distributed software system, known as a Resource Access Layer (RAL), may be utilized. The RAL may also be referred to as a "MarketNet" security kernel (MSK) or a global security kernel (GSK). The RAL is shown as a distributed software system in FIG. 2. The RAL supports secured transactions involving electronic security value units, such that the secured transactions enable particular clients to gain access to particular resources. In an embodiment of the present invention, a client and a resource are connected to a network, such as in FIG. 1, and communicate with each other, supported by the RAL, using a protocol, such as the Simple Network Management Protocol (SNMP).

Figure 2:
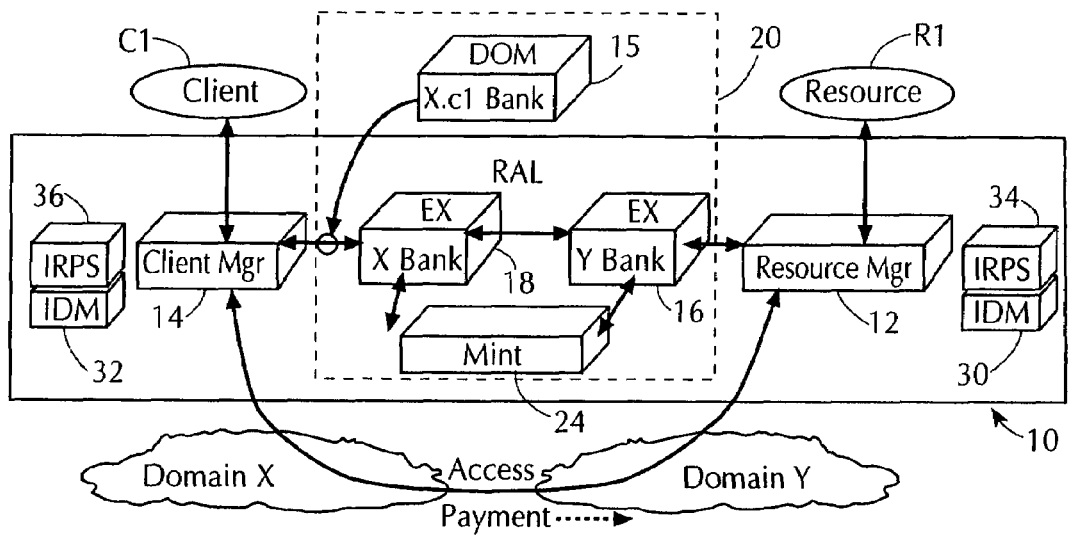
FIG. 2 depicts the system architecture of the inventive Resource Access Layer in accordance with an illustrative embodiment of the present invention.

In FIG. 2, RAL 10 is shown connected to client C1 in domain X of FIG. 1 and connected to a resource R1 in domain Y of FIG. 1. However, it should be understood that the RAL may also be connected to and support transactions with other domains, such as domains U, W, and V in FIG. 1. In fact, if the RAL is associated with computer 11 of domain U of FIG. 1, the RAL will support secured transactions, not throughout a network, but within a stand-alone computer.

The elements of RAL 10 include a client manager 14, associated with the client C1 in domain X. The client manager 14 performs transactions on behalf of client C1. The client manager's functions include requesting access to a resource, transmitting payments to the requested resource, and communicating between the client and the client's local bank (e.g., X.c1 bank server 15). Client manager 14 is illustratively a software server, operating on a JVM or conventional OS platform. Other examples of the implementation of the client manager include a hardware server or an application running on the client (if the client is, e.g., a computer) itself.

RAL 10 also includes a resource manager 12, associated with the resource R1 in domain Y. The resource manager 12 performs transactions of behalf of resource R1. The resource manager 12 functions include receiving payments from the client manager, communicating with the resource's local bank (e.g., Y bank server 16), and optionally advertising prices to access its resource. Note, however, that advertising prices may be accomplished by including a separate price directory server, under the control of the resource manager, not shown. Further, the resource manager may set the pricing strategy for the resources it manages.

In addition, resource manager 12 is also illustratively implemented as a software server, operating on a Java® Virtual Machine (JVM) or conventional OS platform. Other examples of the implementation of the resource manager include a hardware server or an application running on the resource (if the client is, e.g., a server) itself.

RAL 10 further includes, for each domain (e.g., domain X and domain Y), a respective at least one domain manager (not shown). The domain manager may be implemented as part of a respective bank server (e.g., implemented as part of X bank server 18 and Y bank server 16, respectively), or may be a separate entity, such as a software or hardware server.

Each domain manager functions to manage the client and resource managers, discussed above. Thus, in FIG. 2, an X domain manager manages client manager 14 and a Y domain manager manages resource manager 12. An additional function of a domain manager which manages resources managers is to set a "distribution policy," which establishes how much Y currency (in electronic security value units) to distribute, as well as the rate in which distributed Y currency can be spent by a client. For example, the distribution policy allocates for resource R1, a maximum total budget (of distributed Y currency) for all currency domains (e.g., domains U, V, W, X, Y, and Z), a maximum budget for any specific currency domain (e.g., domain X), a maximum total rate of Y currency outflow for all currency domains, and a maximum rate of electronic currency outflow to any specific currency domain. For example, if client C1 requests access to resource R1, the client can only exchange its X currency up to an amount allowed by the distribution policy. Further, the distribution policy sets the rate (in amount and in time) in which client C1 can spend its budget to access resource R1. The distribution policy notwithstanding, the resource manager can also completely deny client C1 access, even if the client has the appropriate Y currency.

Returning now to FIG. 1, it should be understood that in the RAL, associated with the network 5, there may be one or more client managers associated with each client C2 and C3, respectively associated with each domain U and Z. Similarly, there may be one or more resource managers associated with each resource, R2, R3, R4 of domain W, resource R5 of domain Z, and resource R6 of domain U. Alternatively, in one preferred embodiment of the invention, there is one resource manager managing a group of resources R2 and R3 within domain W. Similarly, there may be one client manager managing a group of clients within a single domain.

RAL 10 also contains an electronic banking infrastructure, designated 20 in FIG. 2. It should be appreciated that the banking infrastructure is an organized hierarchy. Bank infrastructure 20 includes a mint bank 24, in the highest level of the hierarchy, an X exchange bank 18, associated with domain X, and a Y exchange bank 16, associated with domain Y, in the middle level of the hierarchy. Lastly, there is shown an X.c1 domain bank 15 in the lowest level of the hierarchy. The X.c1 domain bank is associated with client C1 and X exchange bank 14 of domain X. Accordingly, X bank 18 is the bank of domain X, Y bank 16 is the bank of domain Y, and X.c1 bank 15 is the bank of subdomain X.c1 (i.e., X.c1 is the subdomain of domain X).

The mint bank 24, X exchange bank 18, Y exchange bank 16, and X.c1 domain bank 15 may be implemented as separate software servers, written in C++ and operating on a Solaris® or Linux® platform. Communication between each bank may be encrypted using, e.g., RSA® libraries (for non-commercial use) having public and private keys that are 512 bits long (or of different length), or encrypted using other encryption techniques for commercial use.

The functions of the mint bank include generating currency and performing accounting and auditing for all transactions. To add to the security of this embodiment of the invention, the mint bank, such as mint bank 24, may be configured to perform the function of generating electronic security value units for a domain, only in exchange to an equal amount of electronic security value units for another domain, presented by an exchange bank. In this manner, a domain can not generate more electronic security value units than it has provided to the mint bank; thus, providing added security against fraud. In addition, and as will be described in detail below in Section V, the mint banks also perform accounting and auditing for all transactions it conducts.

The functions of the exchange banks include exchanging of the currency of its domain with the currency of another domain or with the currency from its subdomains, and performing accounting and auditing of transactions. Exchange banks, such as X and Y exchange banks 18, 16, are preferably the only banks that can perform exchange of electronic security value units, in accordance with the policies of their respective domain managers. In addition, exchange banks perform currency exchanges on behalf of their child domain banks. For example, in FIG. 2, X exchange bank 18 can perform an exchange from X currency to Y currency for X.c1 domain bank 15. Further, exchange banks will assume liability for the electronic security value units they acquire from another exchange bank. For example, in FIG. 2, X bank 18 will assume liability for Y currency it receives from Y bank 16. In addition, and as will be described in detail below in Section V, the exchange banks also perform accounting and auditing for all transactions they conduct.

Domain banks, such as X.c1 domain bank 15, similarly enforce the policies of their respective domain managers, and perform accounting and auditing on all transactions they conduct. However, as stated above, domain banks cannot directly exchange currency.

Referring back to FIG. 2, RAL 10 further includes a monitor to detect anomalies by monitoring the transactions of electronic security value units in the secure electronic system. Specifically, RAL 10 comprises an intrusion detection monitor (IDM) 30, associated with domain Y, and an IDM 32, associated with domain X. Each IDM may be implemented in a remote software or hardware server, as shown, or may be combined with other elements of the RAL. For example, IDM 30 may be combined with Y exchange bank 16 and IDM 32 may be combined with X exchange bank 18. However, in a preferred embodiment, IDM 30 and IDM 32 are separate software servers.

As will be described in greater detail below in Section IV and FIG. 13, the IDMs monitors all banks, as well as, associated client and resource managers in the IDM's domain. For example, in an illustrative embodiment of the present invention, the IDM analyzes patterns of spending or payments (of electronic security value units) in real-time to determine whether an attack has occurred. If the IDM detects an anomaly, the IDM will generate an attack notifications to its associated resource managers, and optionally to other IDMs.

In addition, the IDM may generate an attack notification to an associated Intrusion Response Policy Servers (IRPS) 34, 36, shown in FIG. 2. Specifically, RAL 10 includes an IRPS 34, associated with domain Y, and an IRPS 36, associated with domain X. Similar to the IDMs, each IRPS may be implemented in a remote software or hardware server, as shown, or may be combined with other elements of the RAL. In a preferred embodiment, IRPS 34 and IRPS 36 are separate software servers.

As will be described in greater detail below in Section IV, when an IRPS receives an attack notification from an IDM, the IRPS may activate various protection policies to control access by suspicious clients. For example, upon receiving an attack notification, the IRPS may instantly block all further accesses from a suspicious client by configuring an associated bank not to allocate any additional electronic security value units to the suspicious client and to void electronic security value units already distributed to the client.

The above described IDM and IRPS combine to offer powerful attack detection and provide mechanisms to limit the adverse effects of such attacks.

B. Form of Currency

The section discusses the syntax used for electronic security value units in accordance with an illustrative embodiment of the invention. Electronic security value units, i.e., currency, in an embodiment of the present invention, may include information that uniquely identifies the issuer (i.e., the resource exchange bank associated with the requested resource), that identifies the new owner (e.g., the client), and identifies the purpose the particular currency is currently being used for (i.e., to access a particular resource at a particular time). The currency also carries information essential for the proof of its validity. Although the mint bank generates all currency, such information, mentioned above, may be added as the currency flows through the system. For ease of description, currency that has been exchanged and transmitted to the requesting client, for subsequent payment to access a particular resource, will be called a "bill" or "instrument."

Figures 4, 6:
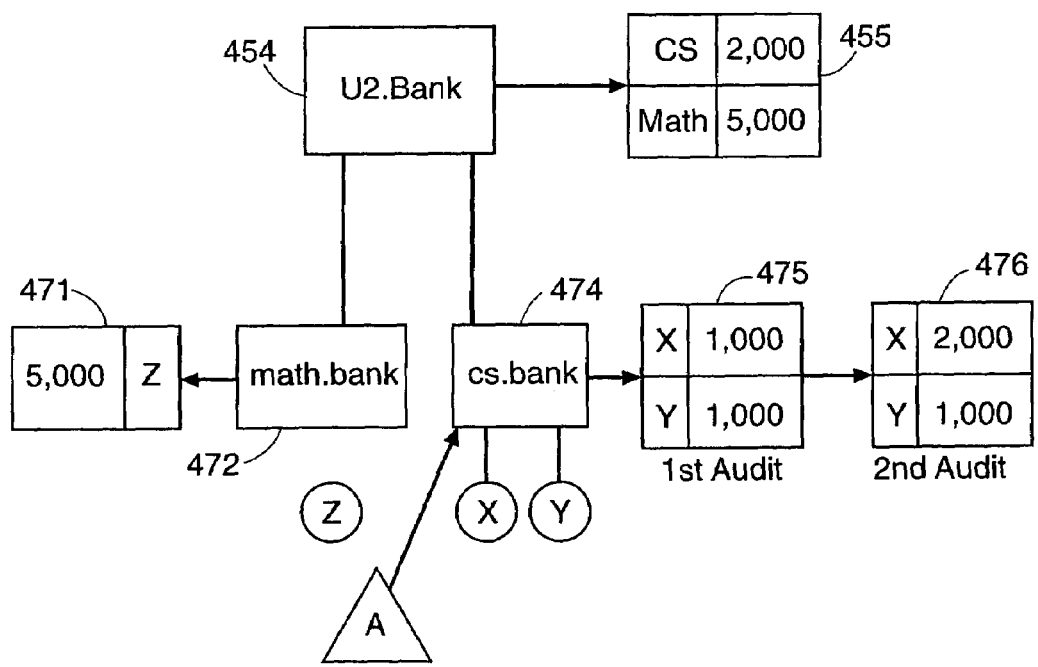
FIG. 4 illustrates an embodiment of the syntax of electronic security value units in accordance with an illustrative embodiment of the present invention.
FIG. 6 schematically illustrates an example of an audit performed by an intrusion detection monitor in accordance with an illustrative embodiment of the present invention.

FIG. 4, illustrates an example of the information, divided into fields, included in a bill. Of course, it should be appreciated that this is only one example and other fields may be included or omitted, as desired. The bill 60 includes an issuing domain's exchange bank field 62, a unique ID field 63, an amount field 64, a validity field 65, a new owner's exchange bank field 66, a purpose field 67, a provider field 68, and a timestamp field 69. Each of these fields are described below:

Issuing domain's exchange bank field 62: Identifies the resource's exchange bank that issued the currency to the client's exchange bank.

Unique ID field 63: Uniquely identifies the particular bill 60, among all bills of the currency domain. In the example of FIG. 1B, the unique ID is 1234. The combination of field 62 and 63 guarantees universal uniqueness of the bill in any domain.

Amount field 64: Provides the value of the bill. This may be expressed in any value (e.g., U.S. dollars, Japanese Yen, a proprietary currency, etc.), determined by the resource manager.

Validity field 65: Provides the expiration time of the bill. As a security measure, each bill has a time limit to access the particular resource.

New owner's exchange bank field 66: Identifies the exchange bank of the new owner of the currency. In other words, it identifies the client's exchange bank.

Purpose field 67: Identifies one of two purpose of the bill, either an "exchange," which means the currency can be used only for currency exchange purposes or a "purchase," which means the currency can be used only to purchase (or access) a resource.

Provider field 68: Identifies the provider (i.e., the resource manager) the bill is intended for. Typically, the provider field 68 is assigned by the client manager to identify the resource manager. This protects from using this bill for any purpose other than the intended purpose.

Timestamp field 69: A placeholder that stores the current time of a transaction.

Figures 7, 10:
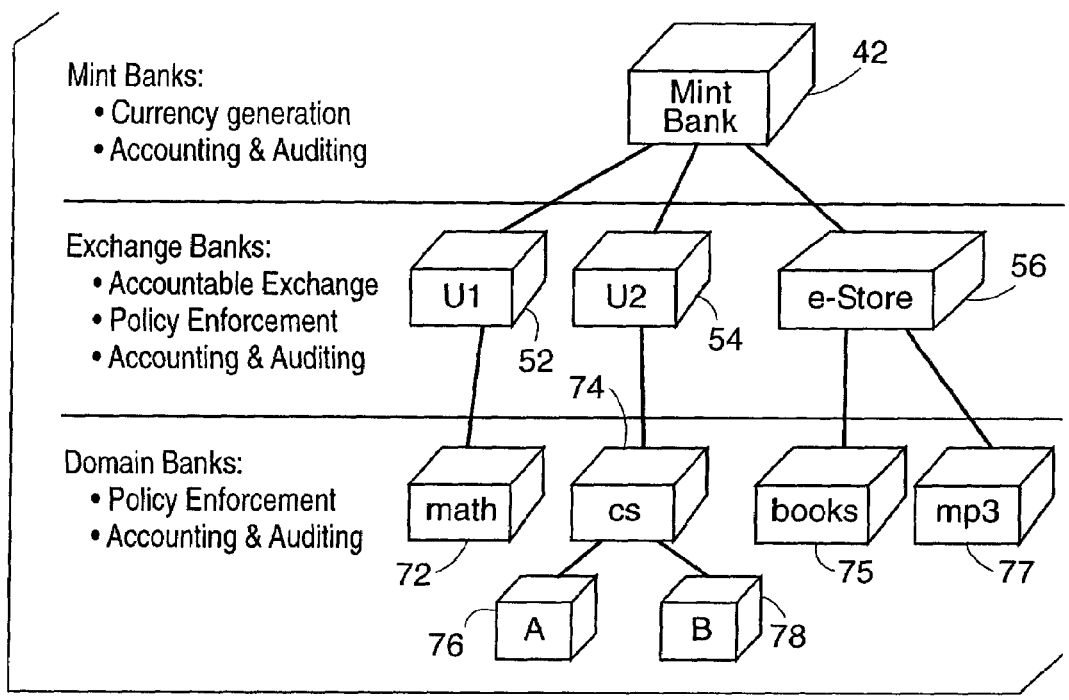
FIG. 7 depicts the inventive banking infrastructure architecture and functionality in accordance with an illustrative embodiment of the present invention.
FIG. 10 illustrates an embodiment of the syntax of electronic security value units in an illustrative embodiment in accordance with an illustrative embodiment of the present invention.

As stated, the foregoing fields are intended to be illustrative only and other fields may be added. For example, as shown in FIG. 10 (described in greater detail in Section IV), a "first association" field may be included that identifies a first association between the unique ID of the bill and client manager who receives the bill. In addition, a "second association" field may be added when the client manager pays the bill to the resource manager. The second association field associates the bill with the particular request to access the resource.

As described, the above fields, included in each bill in an embodiment of the invention, greatly increase security of all transactions by providing numerous identifiers, validity, and other information. For example, and as will be described in Section IV below, if any wrongdoing occurs, it can be determined by whom such mischief was done.

C. Example of a Transaction to Access a Resource

Figure 3:
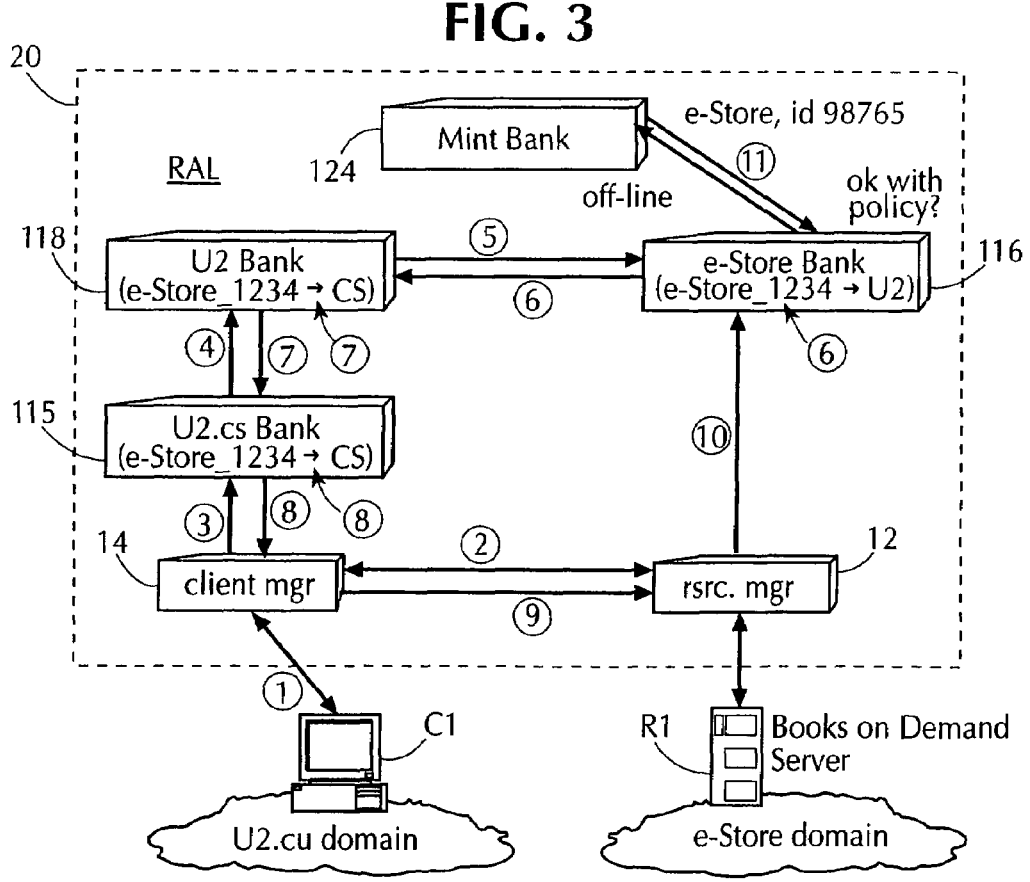
FIG. 3 illustrates an example of a transaction using the Resource Access Layer in accordance with an illustrative embodiment of the present invention.

FIG. 3 is a detailed example that illustrates how electronic security value units are used to enhance security in the electronic system, in accordance with an illustrative embodiment of the present invention. It should be appreciated that FIG. 3 corresponds directly with FIG. 2; however, note that to provide a real-world example, domain X has been replaced with U2.cu domain (University 2, computer science department), and domain Y has been replaced with e-Store domain. Accordingly, Y exchange bank 16 of FIG. 2 is replaced with e.Store exchange bank 116 in FIG. 3, X exchange bank 18 of FIG. 2 is replaced with U2 exchange bank 118 in FIG. 3, and X.c1 domain bank 15 of FIG. 2 is replaced with U2.cs domain bank 115 in FIG. 3.

In the illustrated transaction of FIG. 3, client C1 in the U2.cs domain wishes to access resource R1 for Books-on-Demand in the e-Store domain. The steps in the transaction are given below and correspond with the step numbers indicated in FIG. 3.

Step 1: Client C1 contacts its client manager 14 to request a book-on-demand from resource R1.

Step 2: Client manager 14 acting on behalf of client C1 finds the price to access books-on-demand and the type of electronic security value units (currency) accepted by the resource R1 from resource manager 12.

Step 3: Client manager 14 contacts its local domain bank, U2.cs bank 115 to request exchange of part of the client's U2 currency (i.e., U2 electronic security value units) budget for a budget of e-Store currency (i.e., e-Store electronic security value units).

Step 4: Since U2.cs bank 115 does not have currency exchange capabilities, it requests its parent bank (U2 exchange bank 118) to perform the exchange on its behalf.

Step 5: The U2 bank 118 contacts the e-Store bank 116 with the request for currency exchange and forwards a proper amount of U2 currency.

Step 6: The e-Store bank 116 authenticates the request and checks the validity of the received U2 currency. The bank can now decide whether or not to honor the exchange request. For example, this decision is based on several factors such as the amount of e-Store currency that U2 bank 118 already has, historical data describing normal request behavior by U2 bank 118, the total amount of e-Store currency in circulation, global attack information dissipated by other domains, and other factors. Assume that e-Store bank 116 decides to perform the transaction and records the fact that it passes the e-Store currency with unique identifier 1234, previously generated by the mint bank, to the U2 bank. Further, the e-Store bank adds U2 bank 118 information in the new owner's exchange bank field 66 in FIG. 4, and signs the particular bill, thus making it valid to use.

Step 7: The U2 bank 118 receives the e-Store currency and passes it to the U2.cs bank 115. It records the fact that the particular e-Store currency is now passed to U2.cs bank 115.

Step 8: U2.cs bank 115 receives the e-store currency, records the fact that it is passing it to the client manager 14 on behalf of client C1, and passes the currency to the client manager.

Step 9: Client manager 14 then sends an access request, along with the appropriate payment (in e-Store currency), to resource manager 12. The client manager embeds a signature (or second association) of the request inside the payment, uniquely associating the payment with the particular request.

Step 10: The resource manager 12 validates the payment, checks that the value it carries is sufficient to pay the price for accessing resource R1, logs the access to resource R1, and deposits the received payment with the local e-Store bank 116.

Step 11: Off-line from the transaction, the e-Store bank exchanges the received U2 currency (from step 5) for new e-Store currency. As stated previously, the minting of new currency is done by mint bank 124, since it is responsible for printing new currency for all domains in exchange for currency they have received for their services.

In short, when a client within a first domain requests to access a resource within a second domain, the client requests electronic currency acceptable to the second currency domain in exchange for its own currency. The resource manager, based in part on the distribution policy set by its domain manager, determines whether to exchange the first domain currency of the client for its second domain currency. Once exchanged and once payment (in the form of a bill) from the client is transmitted, the resource manager selectively grants access to the requested resource. The bill provides full liability information to ensure security in the transaction.

D. Preventing Misbehaving Entities from Using Illegally Copied Currency

In an illustrative embodiment of the present invention, the electronic security value units provide protection against a misbehaving entity, such as an attacker, from duplicating and reusing electronic security value units. As a premise, specific electronic security value units may only be used once. Thus, for example, an attacker can "illegally" reuse electronic security value units that have already been used in one of the following ways.

First, a client manager may illegally attempt to double-spend the electronic security value units (or bill). For example, the client manager may copy or duplicate a bill, pay for an access to the resource, and attempt to reuse the duplicated bill for an additional access. Second, the resource manager receiving a bill as payment for accessing a resource, or any entity that received the bill, attempts to double deposit the bill. For example, the resource manager may copy or duplicate a bill, deposit the "real" bill in its local bank, and then attempt to deposit the duplicated bill in the local bank. Third, a "man-in-the middle" steals the bill in transit (e.g., when it is transmitted between the client and resource managers for payment), and uses it for some other purpose. The man-in-the-middle may copy or duplicate the bill and send the original bill to its intended recipient, such that the recipient may not know of the copying.

The first and second illegal reuses, i.e., the double-spending and double-depositing, is prevented because a duplicated bill is easily detected due to the unique ID included in field 63 of FIGS. 4 and 10. The third illegal reuse, i.e., the man-in-the-middle theft, is protectable due to a second unique association, discussed in detail in Section VI below, which may be included in field 84 in FIG. 10, or stored with, e.g., the client manager or elsewhere in the RAL.

IV. Intrusion Detection and Monitoring in an Electronic System

In an illustrative embodiment of the present invention, electronic currency (i.e., electronic security value units) provide a uniform instrument for monitoring access to resources, for identifying anomalous patterns of payment of electronic security value units used to access the resources, and for auditing bank logs of account information. Monitoring access, identifying anomalous patterns of payment, and auditing logs, alone or in concert, will identify an attack.

Once an attack has been identified, the currency information fields (shown in FIG. 4, described hereinabove), and bank logs that store the currency information fields (described in detail below in Section VI and FIGS. 14 and 15), are used to identify the attacker. This will be described in Section V below.

In an illustrative embodiment of the present invention, to limit the adverse affects of an attack, anomalous behaviors, caused by one or more intruders accessing a resource of the electronic system, is detected by a monitoring technique. Each domain in the network may include a monitor, such as an intrusion detection monitor (IDM). In another illustrative embodiment of the invention, once an anomaly is detected, an intrusion response policy servers (IRPS) may activate various protection policies to control access the detected intruder.

As previously described in Section III and shown in FIG. 2, each domain may include an IDM and an IRPS. Specifically, RAL 10 comprises an intrusion detection monitor (IDM) 30, associated with domain Y, and an IDM 32, associated with domain X. Similarly, RAL 10 comprises an IRPS 34, associated with domain Y, and an IRPS 36, associated with domain X. Each IDM and IRPS may be implemented in a remote software or hardware server, as shown, or may be combined with other elements of the RAL. For example, IDM 30 may be combined with Y exchange bank 16 and IDM 32 may be combined with X exchange bank 18. Alternatively, as shown in FIG. 2, IDMs 30, 32 and IRPSs 34, 36 are separate software servers.

The functions of the IDM includes examining and auditing the flow of currency through a respective bank server, resource manager or client manager. For example, an unusually high allocation of budget, distributed by the Y bank 16 to client C1 to access resource R1 may indicate an attack on resource R1. Similarly, if the IDM monitors multiple accesses, by one or multiple clients, to a rarely used resource, the IDM may indicate an attack pattern. In addition, the IDM monitors patterns of spending or payments (of electronic security value units) in real-time, to determine whether an attack has occurred.

Figure 5A:
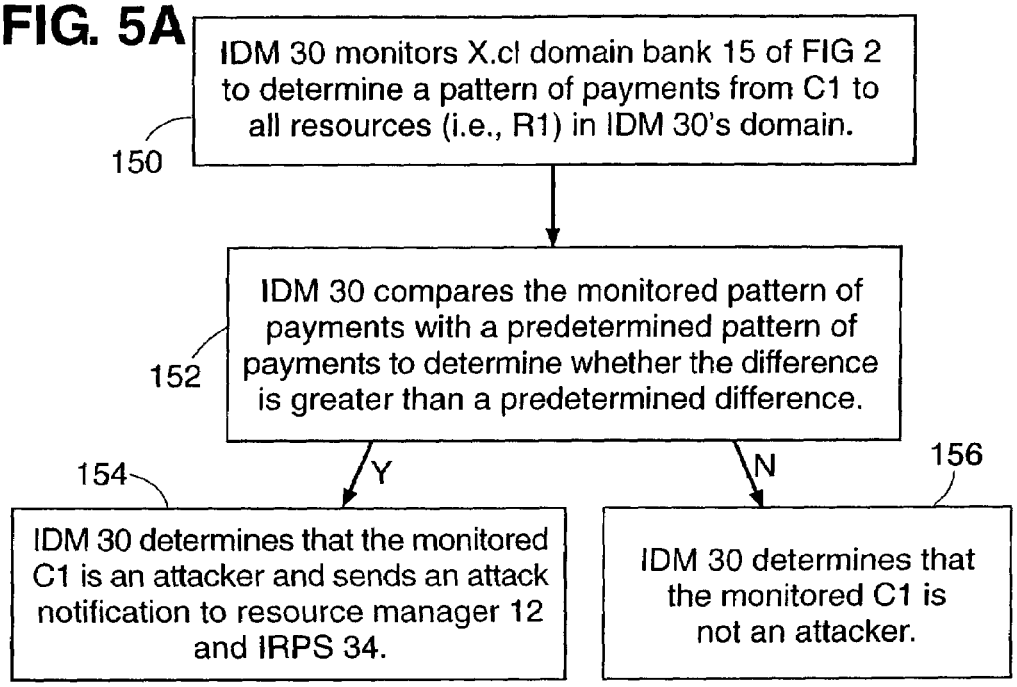
FIGS. 5A and 5B depict flow charts illustrating an inventive technique to identify an attack in accordance with an illustrative embodiment of the present invention.
Figure 5B:
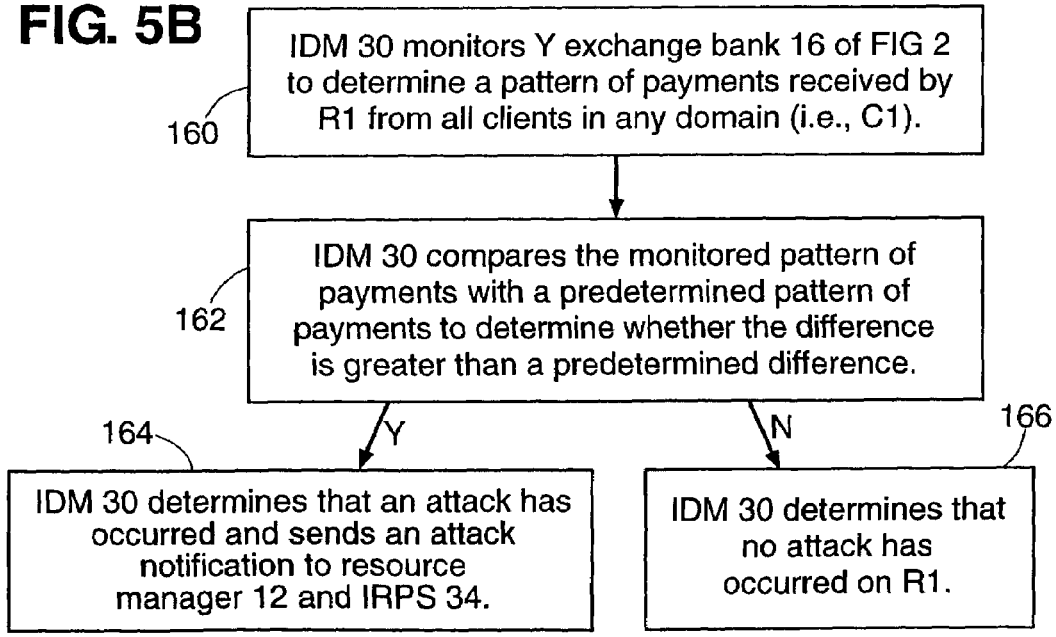

FIGS. 5A and 5B illustrate two techniques to determine whether an attack has occurred, known as "intrusion detection." In FIG. 5A "pattern of payments" from a client are monitored, while in FIG. 5B, pattern of payments to a resource are monitored. Referring to FIG. 5A, in step 150, IDM 30 monitors the X.c1 domain bank 15 of FIG. 2 to determine a pattern of payments from client C1 to all resources or to any specific resource in domain Y. Of course, since there is only resource R1 in domain Y, the pattern of payments is limited to client C1's payments to access resource R1.

In step 152, IDM 30 compares the monitored pattern of payments with a predetermined pattern of payments to determine whether the difference is greater than a predetermined difference. The predetermined pattern of payments is determined, e.g., by statistical algorithms. Further, the predetermined difference can be a range or number and can be determined by a statistical analysis as by determining an average or standard deviation.

If the difference is greater than the predetermined difference, then IDM 30 determines that the monitored client C1 is an attacker and sends an attack notification to, e.g., resource manager 12 and IRPS 34 (described below), as shown in step 154. However, if the difference is less than the predetermined difference, then IDM 30 determines that the monitored client C1 is not an attacker, as shown in step 156.

Referring now to FIG. 5B, in step 160, IDM 30 monitors the Y exchange bank 16 of FIG. 2 to determine a pattern of payments received by resource R1 from all clients in any domain. For purposes of this example, assume that the only payments to access resource R1 were made by client C1.

In step 162, IDM 30 compares the monitored pattern of payments with a predetermined pattern of payments to determine whether the difference is greater than a predetermined difference.

If the difference is greater than the predetermined difference, then IDM 30 determines that an attack has occurred and sends an attack notification to, e.g., resource manager 12 and IRPS 34, as shown in step 164. However, if the difference is less than the predetermined difference, then IDM 30 determines no attack has occurred on resource R1, as shown in step 166.

The IDM also monitors and analyzes accounting logs in each hierarchical bank in its domain to identify an anomaly. Accordingly, an IDM typically conducts periodic audits of the banks in its domain. The IDM analyzes the value of the accounts in each bank to ensure consistency.

An example of an IDM audit is illustrated in FIG. 6. FIG. 6 shows exchange bank U2 454 having two child domain banks, math bank 471 and cs bank 474 associated thereto. An abbreviated example of an account log for each bank is shown in FIG. 6 (a more detailed example of account logs is described in Section VI and FIGS. 14 and 15). Specifically, U2 bank 454 includes account log 455 for math bank 471 and cs bank 474. The math bank 471 includes account log 471 for resource Z, and the cs bank 474 includes account log 475 from a first audit and account log 476 from a subsequent second audit (as will be described below) for resources X and Y.

When IDM 30 performs an audit, it verifies that the account information in the child banks (i.e., math and cs) match the account information in their parent bank (i.e., U2). Of course, the IDM may monitor a respective mint bank (not shown for simplicity), and any other bank in the banking infrastructure, as desired. Consider a first audit performed by IDM 30. During the first audit, log 455 of U2 bank indicates that math bank has $5,000. This corresponds with math bank log 471. Similarly, log 455 indicates that cs bank has $2,000. Since log 475 indicates that X and Y each have $1,000, these logs correspond as well. Thus, no anomalies are detected during the first audit.

However, let us now assume that an attacker "A" attacks and conquers the cs bank and steals $1,000 from X's account. Let us also assume that A uses the currency to pay for $1,000 worth of X's resource. In other words, A is stealing X's currency to access X's resource. Once this occurs, and X is paid the $1,000 worth of currency from the attacker and subsequently deposits the $1,000 of X currency back to the cs bank. Thus, X's account log 476 will incorrectly indicate that X has $2,000.

Now, when IDM 30 performs a second audit, it will compare log 455, which indicates that cs bank has $2,000, with log 476 indicating that cs bank has $3,000. Thus, the IDM will indicate an attack has occurred, and IDM 30 will relay an attack notification, as previously described.

Referring back to the IRPS, its functions include activating various protection policies to control access by an attacker, indicated by the IDM. The IRPS supports control of budgeting that is reflected in the domain manager's electronic security value unit distribution policy of the domain. The IRPS may further advise resource managers to dramatically increase the price to access an attacked resource, or conversely to reduce the price of a resource in the domain to try to lure the attacker out of the attacked resource. In addition, the IRPS may instantly block all further accesses from a suspicious client by configuring an associated bank not to allocate any additional electronic security value units to the suspicious client and to void electronic security value units already distributed to the client. The IRPS may distribute attack information to other IRPSs. Further, it may use such received attack information from other IRPSs to suggest adjustments of prices, electronic security value unit distribution policies, and local access control policies enforced by resource managers to prevent imminent potential attacks.

V. Quantifying the Risk and Limiting Exposure to Attacks in an Electronic System A component of the electronic system, such as a client, is allowed access to a resource only in exchange for payment of an appropriate amount of a resource-dependent security value unit. A bank server of the resource domain selectively distributes the security value units to components, according to the bank's currency distribution policy. The distributed security value units constitute the budget of the component.

Resource managers determine the prices for the resources they manage. Prices can be static or dynamic. Static prices are used to quantify the amount of access a specific budget allows. Dynamic prices can reflect the operating conditions and security considerations of the resource manager. In addition, dynamic prices introduce time variation in the security properties of resources. Finally, the resource owner can charge all clients the same or vary the price per client or group of clients.

Independent of the budget that a client possesses, the resource manager may impose limits on the way a particular client spends its budget to access the resource it manages. Several mechanisms can be used to describe and enforce such restrictions. For example, in an illustrative embodiment of the present invention, the well-known "leaky bucket" mechanism has been used to control the way the client spends its budget and limit the amount of access to a particular resource.

Resource managers use these mechanisms to determine and adjust their exposure to attacks. By controlling the prices and the budgets available to clients, a resource manager determines the amount of access rights a client has to a resource.

In an illustrative embodiment of the invention, both the measure of exposure to an attack on, e.g., a resource, as well as the measure of attack power of, e.g., one or more components, can be quantified and controlled. In particular, a price set for a resource, or for each resource in a group of resources, where each resource has its own price, is determined in currency (i.e., electronic security value units). This is illustratively done by the resource or resource manager. Next, a budget is determined by, e.g. a domain or resource manager, and the currency is distributed to one or more clients. A measure of exposure to attacks of the resource, as well as a measure of attack power by the components, can then be determined, determined based on the determined price and on the budget. In addition, access to the resource is controllable, based on either or both of the above measures.

Further, either of the above measures may be controlled by dynamically adjusting one or both of the price or the budget. In addition, access to the resource may be further controlled by limiting the number of accesses to the resource, by the clients, regardless of the amount of electronic security value units paid by the component to access the resource. Both of the above measures of exposure and of attack power may be expressed in numerical values. Further, both measures may be expressed in security category values of differing degrees of risk, such as critical, high, moderate low, unimportant, etc.

In short, the risk of attack of a resource, as well as the attack power of a client are measurable. Therefore, a client can be denied access to the resource when said risk of attack is above a predetermined threshold. The threshold can be dynamically adjusted, as desired. Accordingly, the resource is protected against attacks.

Section IV, parts A-C, below, illustrate additional examples of mechanisms utilized by the resource manager to limit exposure to attacks, namely, control of budget allocation, price control, and control of budget expenditure.

A. Control of Budget Allocation

As stated, budget allocation is controlled and enforced by the domain manager. For reasons of scalability, budget (currency of the resource manager's domain) is allocated to requesting domains and not to individual clients. For example, Y bank server 16, in FIG. 2, allocates Y currency to the X bank server 18, and not directly to client C1. Distribution policies can enforce restrictions on several aspects of currency distribution. As previously presented in connection with FIG. 1, the distribution policy allocates for a resource R1, a maximum total budget (of distributed Y currency) for all currency domains (e.g., domains U, V, W, X, Y, and Z), a maximum budget for any specific currency domain (e.g., domain X), a maximum total rate of Y currency outflow for all currency domains, and a maximum rate of electronic currency outflow to any specific currency domain. For example, if client C1 requests access to resource R1, the client can only exchange its X currency up to an amount allowed by the distribution policy. Further, the distribution policy of the domain manager sets the rate (in amount and in time) in which client C1 can spend its budget to access resource R1. Notwithstanding the distribution policy, the resource manager can also completely deny client C1 access, even if the client has the appropriate Y currency.

B. Price Control

Resource managers set and adjust prices to access the resources they manage. The pricing policy itself is decided by the resource and may be static or dynamic. Although static prices are simpler to implement, advertise, and maintain, dynamic prices are more powerful. They provide feedback that can influence user behavior, they can be used to dynamically change the number of clients that possesses the appropriate budget to pay for accessing a resource, and they can alleviate the effects of attacks by forcing attackers to spend their budget at an increased rate. Dynamic prices can be a function of several parameters.

Figure 8A:
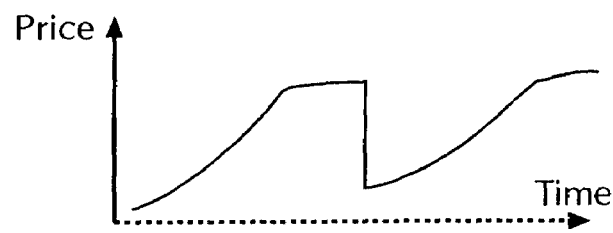
FIG. 8A graphically illustrates dynamic pricing policy that is dependent on time in accordance with an illustrative embodiment of the present invention.
Figure 8B:
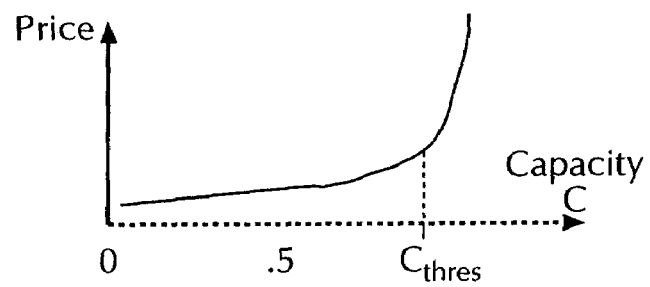
FIG. 8B graphically illustrates dynamic pricing policy that is dependent on the service capacity of a resource in accordance with an illustrative embodiment of the present invention.

FIGS. 8A and 8B depict two such pricing policies; FIG. 8A graphically illustrates a pricing policy that depends on the time during the day when the resource is used and FIG. 8B graphically illustrates a pricing policy that depends on the service capacity C of a resource that is currently being used by all clients accessing the particular resource. In the time-based pricing policy in FIG. 8A, the price of a resource rises and falls based on the time of day when the resource is accessed. Of course, the exact rise and falls are set by the resource. In the capacity-based pricing policy in FIG. 8B, the resource manager sharply increases the price to access the resource above a predetermined threshold capacity, Cthres, providing feedback to the clients that the resource is entering into an undesirable "region of operation." Legal users and attackers will have to pay the increased price to continue accessing the resource.

In addition, the resource manager can provide access to the resource for a different price to different clients. Differentiated prices can play an important role to security. For example, attackers may see a much higher price than normal clients. This will deplete an attacker's available budget much faster and, in certain cases, prevent the attack.

C. Control of Budget Expenditure

Control of budget expenditure refers to restrictions a resource manager imposes on clients limiting the amount of budget they can spend to access a resource. Control of budget expenditure introduces the need to describe and enforce such restrictions to each client. One approach that is simple yet particularly powerful in both expressing and enforcing these restrictions is a variant of the well-known "leaky bucket" technique. This technique allows per-client control of budget expenditure restrictions at different time scales. In this variant of the leaky bucket, the resource manager controls the total amount of budget expenditure, the period over which the budget can be expended, and the rate of expenditure of the budget.

Figure 9:
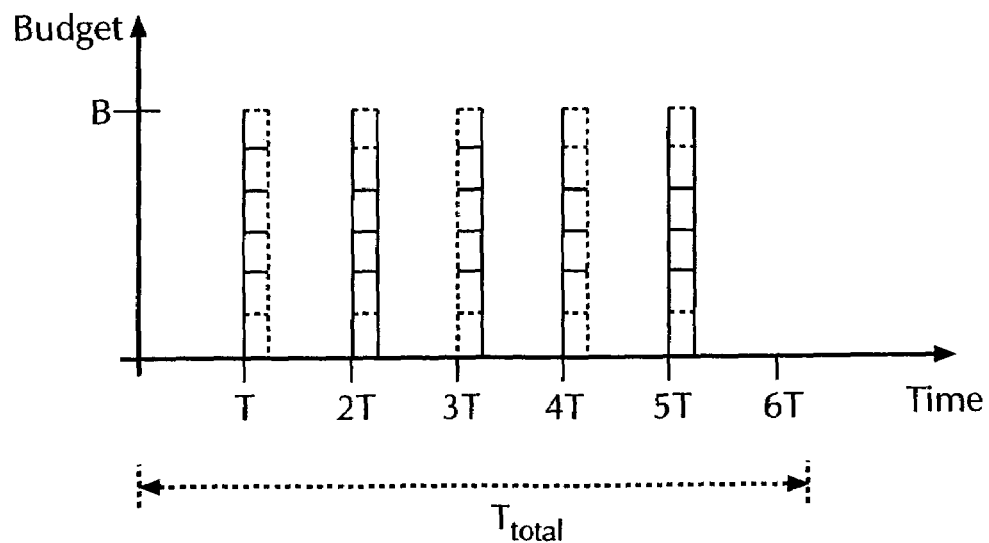
FIG. 9 graphically illustrates an example of the leaky-budget expenditure control mechanism in accordance with an illustrative embodiment of the present invention.

The expenditure control mechanism divides time in equal units of duration T, as depicted in FIG. 9. Within each time slot of duration T, the client can spend up to a total of B units of its available budget. The B units are made available to the client at the beginning of each time slot. If the client spends the B units of currency before the end of the time slot, the client remains idle until the beginning of the next time slot. The client can keep spending B units within each time slot, up to a total of Btotal units of budget. The client's expenditure is restricted within a period of time Ttotal.

There are two important features of this mechanism. First, it guarantees that a particular client can spend no more than B units of currency at any point in time, independent of the actual budget of the client. Second, the resource manager can control the rate R of the client expenditure at any required granularity. This rate is given by $R=B/T$. For example, if the target rate is 10 units of currency per second and the required granularity T is 1 second, then B is set to 10.

In summary, it should be appreciated that the above mechanisms for limiting exposure to an attack are complementary. For example, control of budget allocation and control of budget expenditure are two complementary mechanisms that can be used to quantify security at different granularity and time scales.

VI. Identification of an Attacker in an Electronic System

To protect a network against unauthorized access to a resource, an embodiment of the present invention provides a paradigm to identify a client or an attacker that uses currency (electronic security value units) to access a resource.

A. Identification by Analyzing Associations

As previously stated, once a client (specifically, the client manager) transmits a payment of electronic security value units to the resource manager to access a resource, and the payment is deposited by the resource manager to its local bank, the identification of the client who accessed the resource is obtainable and undeniable proof that the client accessed a particular resource can be generated.

This is true due to two associations, as will be described below. FIG. 10 illustrates the fields of bill 80. As should be obvious, bill 80 is identical to bill 60 of FIG. 4, but further includes a "first association" field 82, and a "second association" field 84, described below.

With reference to FIG. 2, we will assume that client C1 requested access to resource R1 and its client manager 14 has requested an exchange of currency from X currency to Y currency from Y bank 16. Let us further assume that the Y bank exchanges the X currency to Y currency, indicated as bill 80 in FIG. 10.

Once the exchange takes place, a "first association" is made between Y bank 16, who issues the Y currency to the X bank 18, and client manager 14, who receives the Y currency from its X bank 18. However, the first association may be separated into two parts. For example, the first part of the first association may be created and recorded by Y bank 16, which indicates that the Y currency was transmitted to X bank 18, who is now liable. The X bank 18, now may create and recorded by the second part of the first association, which indicates the new recipient of the Y currency (e.g., client C1 via client manager 14).

This first association may be stored in the X bank where, e.g., where the second part of the first association occurs, or may be stored in the first association field 82 of bill 80, or may be stored anywhere else in the RAL 20, as desired. As described above, since X bank 18 is liable for the bill, once it received the Y currency from the Y bank, it may be desirable for the X bank to store the first association therein.

In general, the first association encapsulates passing of liability information for a particular bill. This information is sufficient to allow tracing of the particular bill to the responsible (i.e., to the liable) entity. Therefore, although the above example only illustrated first and second parts, the first association may contain as many parts as the entities involved in the transfer between the producer of a particular bill and its final recipient. The parts may selectively be stored anywhere in the RAL, including within the fields of the bill and stored in the banks that transfer the particular bill.

Now assume that the X bank transmits bill 80 to client manager 14, who, in turn, transmits bill 80 as payment to resource manager 12 to access resource R1. This transaction establishes the "second association." Specifically, the second association links the particular bill to the access of the particular resource, i.e., R1. The second association may be stored in the client manager 14, in a second association field 84, or anywhere else in the RAL, as desired.

At any point thereafter, the identity of the client can be determined. The first association is sufficient to identify the exchange bank liable for the bill that was used. The liable exchange bank has in its log information of the entity (such as the client manager) to whom the exchange bank passed the bill.

However, if it is necessary, for example, to prove that a particular client is responsible for a particular access, then the second association should be analyzed. Accordingly, the recorded second association is analyzed to determine which electronic security value units were used to access the resource. Once the actual electronic security value units used by the client are determined, the first association of the actual electronic security value units is analyzed. This first association indicates the client. Therefore, using this powerful feature of the present invention, the attacker is identified and provably linked to a particular attack. In addition, note that the first and second associations are protected against, e.g., unauthorized access, tampering, and duplication. This may be achieved by various protection techniques, such as by encryption.

VII. Banking Infrastructure for Generating and Managing Access Rights in an Electronic System In an illustrative embodiment of the present invention, a banking infrastructure is responsible for generating access rights (to access resources) and for controlling the secure distribution of the same, along with liability associated with their usage to access resources.

A. Architecture of the Banking Subsystem

As shown in FIG. 7, an illustrative banking architecture is hierarchical and distributed. FIG. 7 illustrates a more detailed banking hierarchy than the banking hierarchy previously described with reference to FIG. 2. In FIG. 2, the banking hierarchy included mint bank 24, exchange banks 18 and 16 of respective domains X and Y, and domain bank 15 of subdomain X.c1. However, in the banking structure of FIG. 7, three domains are illustrated, namely U1, U2, and e-Store, as indicated by their respective exchange banks 52, 54 and 56. Each domain is associated with mint bank 42 and with several subdomains (indicated by their domain banks) that preferably have their own currency and currency distribution policies. For example, the U2 currency domain is parent to a currency subdomain, cs 74 (or U2.cs), which in turn is parent to two additional currency subdomains, "A" 66 and "B" 68 (or U2.cs.A and U2.cs.B). U1 currency domain is parent to currency subdomain, math 72 (or U1.math), and the e-Store currency domain is parent to two subdomains, books 65 and mp3 67. Each of the above subdomains, represented by its corresponding domain bank, may have its own subcurrency and currency distribution policies (i.e., its own electronic security value units and policy for distribution of these units). For example, books 75 and mp3 77 may have the same e-Store currency or may have their own e-Store.books and e-Store.mp3 currency.

As previously explained, each bank may be located in a remote software or hardware server, or may be combined in any combination. As an example, each bank may be an independent software server, written in C++ and operating on a Solaris® or Linux® platform.

Preferably, for security, mint banks are the only entities capable of generating currency. In addition, mint banks also perform accounting and auditing for all transactions. That is, for each occurrence that mint bank 42 generates currency of one domain, in exchange for an equivalent value of currency of another domain, this transaction is recorded in the mint bank log (described below with reference to FIG. 14). Note that for security, cryptographic techniques are utilized to provide assurances that currency is not forgeable.

Preferably, exchange banks are the only entities that can perform exchange of currencies, in accordance with to the policies of their respective currency domains. Exchange banks also perform accounting and auditing of transactions. In addition, exchange banks perform exchanges on behalf of its respective child banks in the subdomain. Further, exchange banks will assume liability for the currency they acquire from other exchange banks of different domains. For example, U1 exchange bank 52 is liable for e-Store currency that it receives from the e-Store exchange bank 56.

Preferably, domain banks similarly enforce the policies of its respective subdomain, and perform accounting and auditing. However, in an embodiment of the present invention, domain banks cannot directly exchange currencies with other banks. That is, the domain banks have to exchange currency through a respective exchange bank.

It should be noted that in a preferred embodiment of the invention, the only way to generate currency in each domain is through the mint bank. For example, in FIG. 7, assume U2 bank 54 presents mint bank 42 with four electronic security value units of e-Store currency. The mint bank will check its validity, create an equivalent amount of electronic security value units of U2 currency, update the budget records for the e-Store bank 56 and U2 bank 54, and return the four U2 electronic security value units of currency to U2 bank. The newly generated currency contains the name of the currency domain it is intended for, along with a unique currency identifier, and is signed by mint bank 42. U2 bank further signs it prior to exchanging it for other currencies, as desired.

The above described banking hierarchy adds great security, since, in this embodiment, only mint banks generate currency, and only exchange banks exchange currency between domains. Further, as will be described in detail below, each parent bank keeps a complete log of all transactions and accounts for all child banks below it. In addition, this hierarchical accounting allows audits to determine whether there are any inconsistencies between account information.

B. Exchange of Currency in the Banking Subsystem

Figure 11:
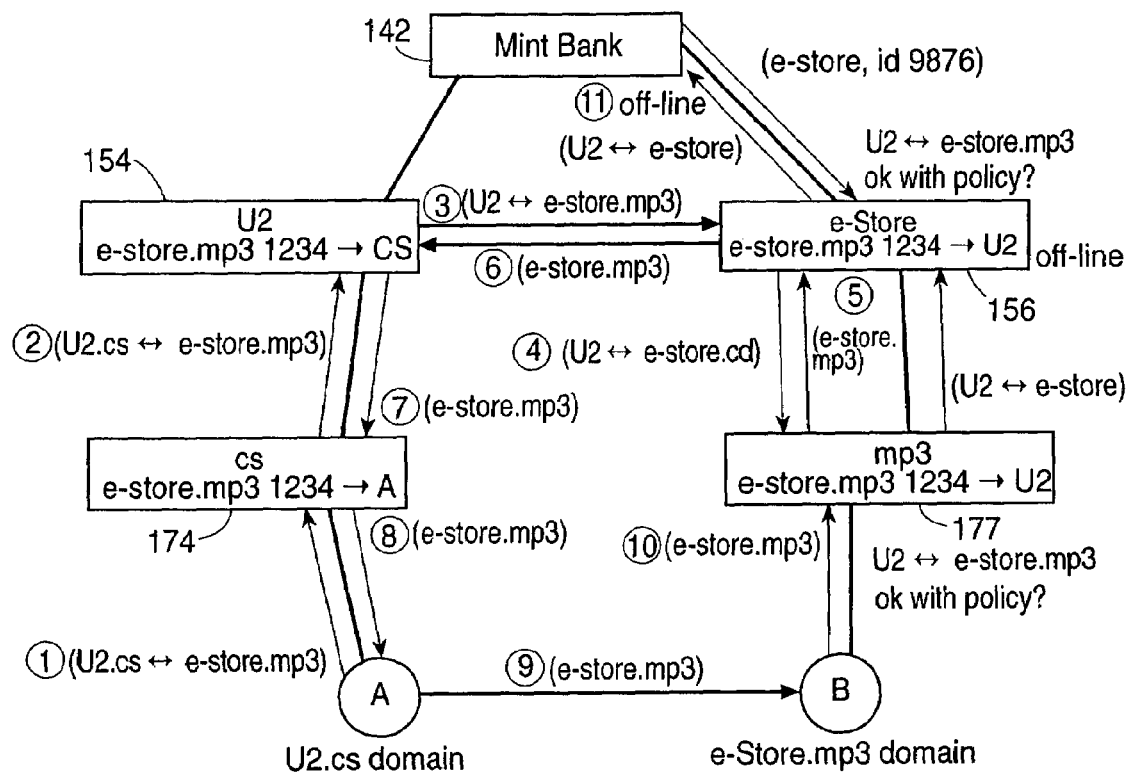
FIG. 11 depicts a sample transaction between entities in unrelated domains in the present invention.
Figure 12:
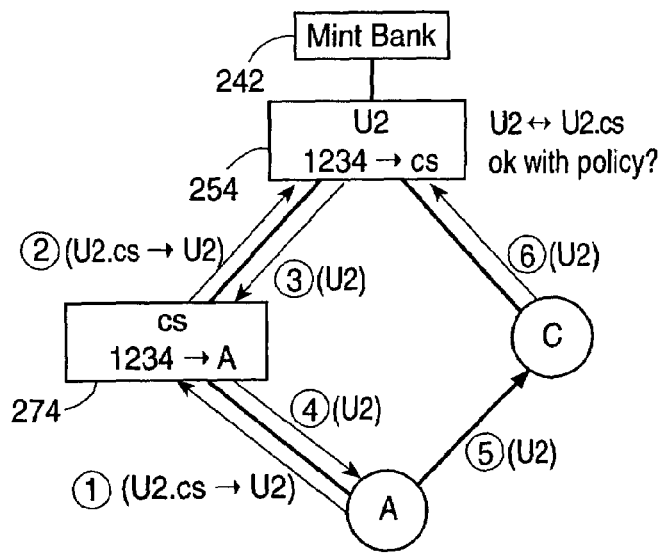
FIG. 12 depicts a first sample transaction between entities in related domains in accordance with an illustrative embodiment of the present invention.
Figure 13:
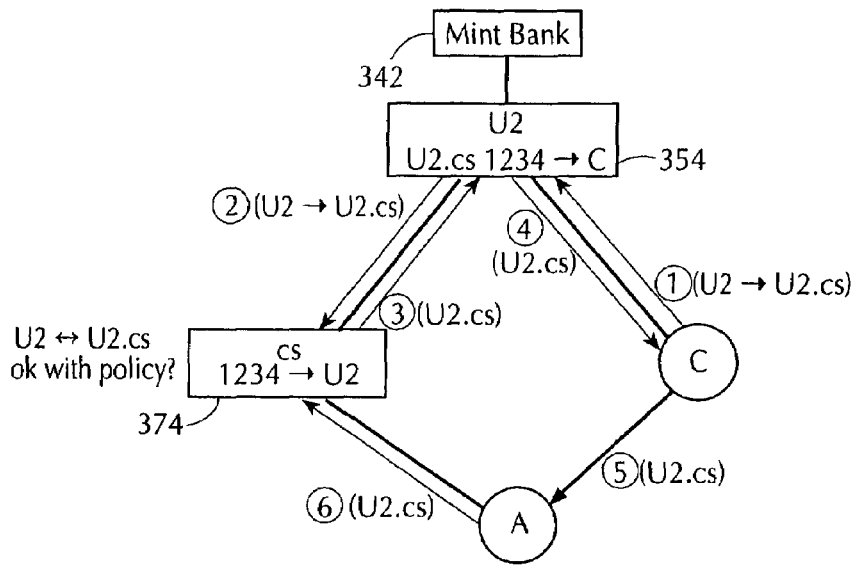
FIG. 13 depicts a second sample transaction between entities in related domains in accordance with an illustrative embodiment of the present invention.

FIGS. 11-13 depict three sample transactions through the banking hierarchy to access a resource using electronic security value units. In FIG. 11, the client A and resource B each belong to unrelated domains, i.e., domains U2 and e-Store. In FIG. 12, however, the client A and resource C belong to the same domain, i.e., domain U2. Similarly, in FIG. 13, the client C and resource A belong to the same domain, i.e., domain U2. As demonstrated by FIGS. 12 and 13, the hierarchical relation does not imply that a higher bank (e.g., an exchange bank) can access a lower bank (e.g., a domain bank), without permission, and vice versa. In all exchanges of currency and transfers of currency to other banks or to components (e.g., to clients) in the electronic system, the bank that transfers the currency performs and records an association between the currency it transfers and the entity that receives it, to be able to later trace back the entity that is liable for a particular access through a particular bill. The examples in FIGS. 11-13 focus in the steps involved in transactions and omit details about creation and recording of such liability associations.

In FIG. 11, the transaction proceeds in accordance with the following steps. Note that the step numbers are indicated in the figure.

Step 1. Client A (through it's client manager) in domain U2.cs contacts its local domain bank (U2.cs bank 174) to exchange part of its U2.cs currency budget for e-Store.mp3 currency to access resource B.

Step 2. Since U2.cs bank 174 is a domain bank and not an exchange bank, it cannot perform the exchange. Therefore, U2.cs bank 174 forwards the request to U2 bank 154, along with the appropriate amount of U2.cs currency from A's account.

Step 3. U2 bank 154 contacts e-Store bank 156 with the exchange request and the appropriate U2.cs currency.

Step 4. The e-Store bank checks if the request conforms with its currency distribution policy. If it does, it forwards the request along with the received U2.cs currency to mp3 bank 177.

Step 5. The mp3 bank checks if the request conforms with its currency distribution policy. If it does, it takes local (e-Store.mp3) currency (with unique identifier 1234) from its reserves, encodes the new owner (U2 bank) inside the currency (e.g., in the "new owner's exchange bank" field 66 in FIGS. 4 and 10), signs the currency, passes it to e-Store bank 156, and records the transaction in its local log.

Step 6. The e-Store bank then passes the e-Store.mp3 currency to U2 bank 154 and records the transaction.

Step 7. U2 bank 154 then passes the currency to cs bank 174, and records the transaction.

Step 8. The cs bank 174 passes the currency to A, and records the transaction.

Step 9. Client A pays resource B for the transaction (i.e., A's client manager pays B's resource manager).

Step 10. The resource B may now, or at any time later, deposit the revenue with its local bank.

Step 11. Off-line from the transaction, e-Store.mp3 triggers the creation of new e-Store currency, by depositing with mint bank 142 (through its parent e-Store bank) the previously received U2.cs currency. The mint bank generates new e-Store currency, with unique id 9876 and passes it back to e-Store.

Clients and resources, such as those presented in FIGS. 12 and 13, that belong to hierarchically related domains have to perform exchanges similar to the transaction of FIG. 11. In FIG. 12, the transaction proceeds in accordance with the following steps.

1. Client A of domain U2.cs, contacts its local bank (U2.cs bank 274) to exchange part of its U2.cs currency budget to U2 currency to access resource C of domain U2.

2. U2.cs bank 274 contacts U2 bank 254 with the request and with the appropriate amount of U2.cs currency.

3. U2 bank 254 checks if the request conforms with its currency distribution policy. If it does, the U2 bank takes local U2 currency (with unique identifier 1234) from its reserves, encodes the new owner (U2.cs bank) inside the currency, signs the currency, passes it down to U2.cs bank 374, and records the transaction.

4. The U2.cs bank passes the currency to client A and records the transaction.

5. Client A pays resource C to access its resource.

6. Resource C may now, or at any time later, deposit the revenue with its local bank (U2 bank), that will credit its account. No transaction with mint bank 242 is necessary in this case.

In FIG. 13, the transaction proceeds in accordance with the following steps.

1. Client C contacts its local bank (U2 bank 354) to exchange part of its U2 currency budget to U2.cs currency.

2. U2 bank 354 contacts U2.cs bank 374 with the request and with the appropriate amount of U2 currency.

3. The U2.cs bank checks if the request conforms to its currency distribution policy. If it does, U2.cs bank 374 takes local U2.cs currency (with unique identifier 1234) from its reserves, encodes the new owner (U2 bank) inside the currency, signs the currency, passes it to U2 bank 274, and records the transaction.

4. U2 bank 354 passes the currency to client C and records the transaction.

5. Client C pays resource A to access the resource.

6. Resource A may now, or at any time later, deposit the revenue with its local bank (U2.cs bank), which will credit its account. As with FIG. 12, this case requires no transaction with the mint bank.

C. Information Logged by the Banking Infrastructure

Bank servers collect audit trails of all transactions that can be logged and later audited by, e.g., IDM 30, described above. Each bank server in the banking hierarchy logs different information. The information logged should be sufficient to allow undeniable accountability in the access of resources.

Figure 14:
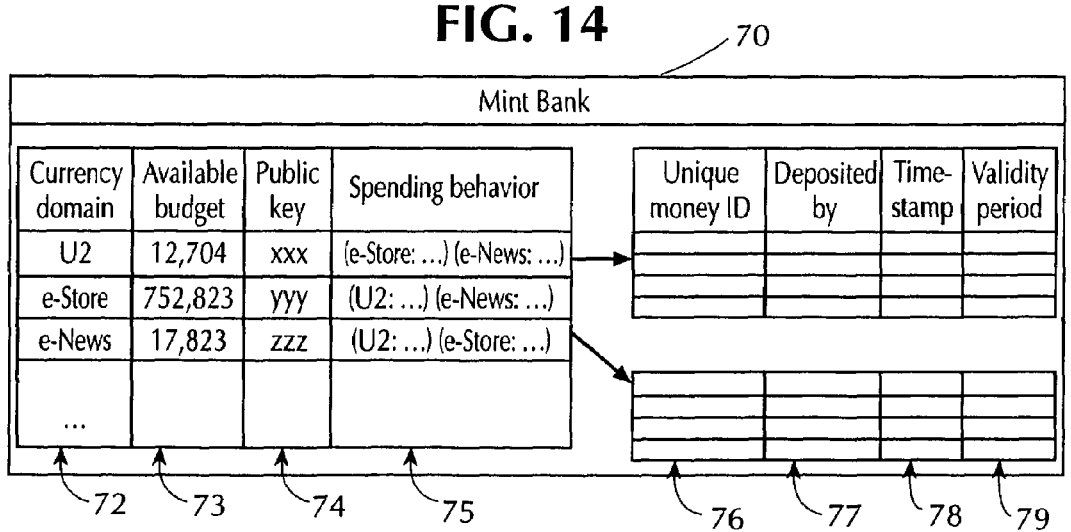
FIG. 14 shows the information maintained in the log of the mint bank in accordance with an illustrative embodiment of the present invention

FIG. 14 illustrates an example of the information maintained in the mint bank log 70. Of course, it should be appreciated that this is only one example and other information may be recorded or omitted, as desired. The log includes a record of currency domains 72, their respective available budget 73, and a public key 74 for encryption purposes. In addition, log 70 includes the following information:

Spending behavior statistics 75: The mint bank records the aggregate spending behavior of each domain 72. For example, what currencies it acquires, how much it is spending of each currency, and various other statistics of its spending behavior.

Unique ID 76: The mint bank includes a Unique. ID number in the currency it generates. For example, it may be included in the Unique ID field 63 of FIG. 4.

Lastly, the mint bank log includes information regarding deposit information. The log records the identify of the exchange banks that deposited currency therein in 77. This currency is timestamped in 78, and has a validity period, in 79, that provides an expiration date on the deposited currency.

Figure 15:
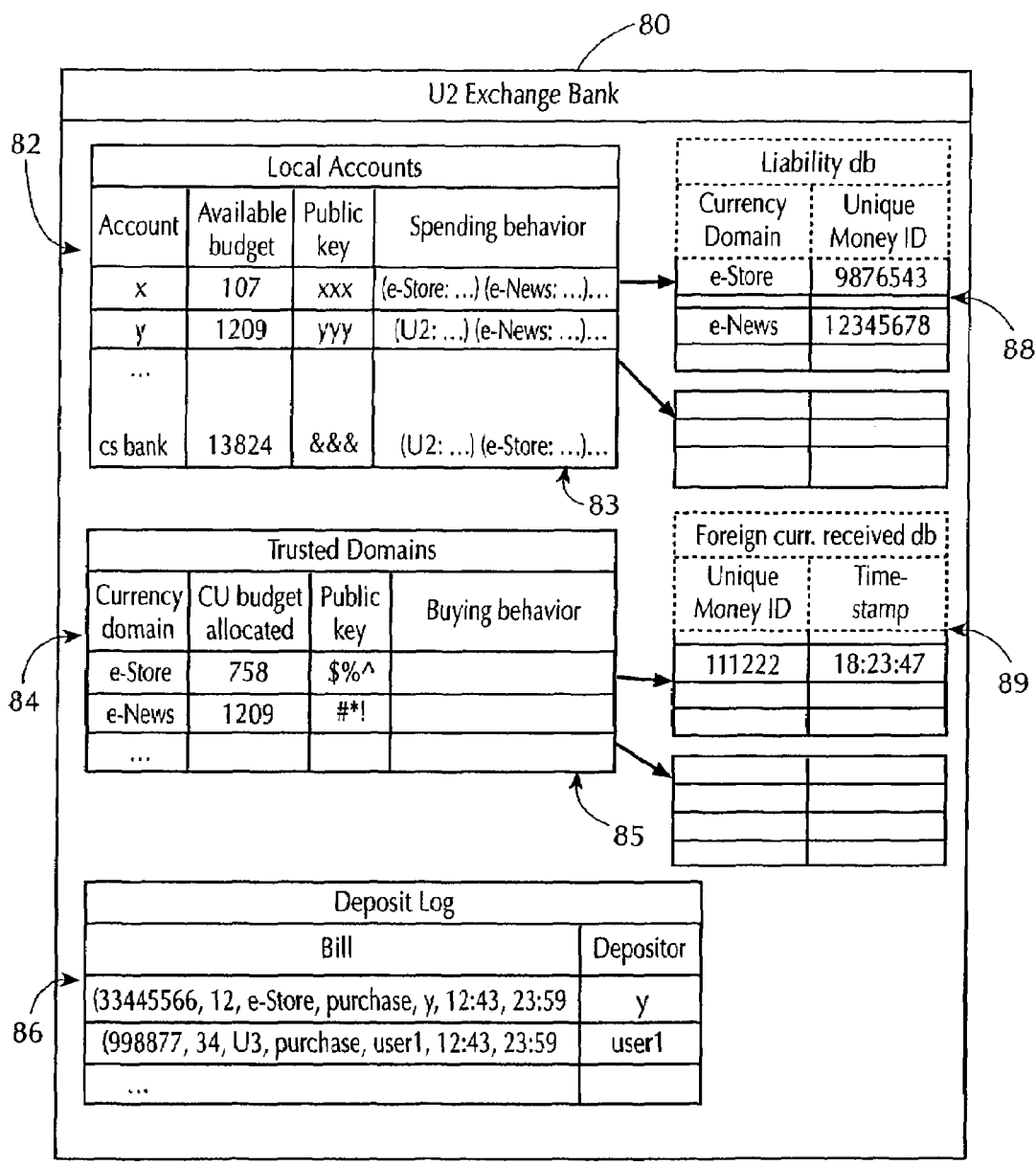
FIG. 15 shows the information maintained in the log of the exchange banks in accordance with an illustrative embodiment of the present invention

FIG. 15 depicts the information maintained in the exchange bank log 80. The exchange banks serve two types of customers. Internal customers (i.e., local accounts 82) which are individual clients and currency subdomains directly attached to the bank. External customers (i.e., trusted domains 84) are exchange banks of a different domain authorized to perform currency exchanges. The logs related to internal customers include:

Spending behavior statistics for each client 83: The exchange bank records, for each of its clients, its aggregate spending behavior, the types of currency it acquires, the amount of expenditure with each domain, and various other statistics of its spending behavior. Spending behavior logs are hierarchical. While mint banks maintain the spending behavior of each currency domain represented by its exchange bank, the exchange banks maintain the spending behavior of each of their individual clients.

Liability transfer information 88: When exchanging currency on behalf of a client, the exchange bank assumes liability for the later usage of this currency. The bank logs information about the client on whose behalf the exchange took place. For example, the logs reveal that a bill from e-Store with unique money ID 9876543 had been passed to client A. Accordingly, client A will be held responsible in case of misuse of the particular bill.

Bill deposit information 86: The bank keeps temporary logs of recent deposits. For example, currency having the fields (second association, first association, U2, 33445566, 12, 23:59, e-Store, purchase, B, 12:43) is deposited by client B. This corresponds with the fields of FIG. 10, namely, second association field 84, first association field 82, a domain's exchange bank field 62, a unique ID field 63, an amount field 64, a validity field 65, a new owner's exchange bank field 66, a purpose field 67, a provider field 68, and a timestamp field 69.

For each of the external customers (i.e., the known or "trusted" exchange domains), the exchange bank maintains logs that include:

Buying behavior statistics 85: The exchange bank strictly controls the budget it allocates to each exchange bank in an external domain. The budget allocation statistics are analogous to the spending behavior statistics for its internal clients. Budget allocation statistics capture the currency purchase request behavior of external currency domains.

Recent exchange activity 89: The bank logs unique money IDs and timestamps of external currency it has accepted in exchange for its own currency. As shown, the exchange bank has accepted e-Store currency with a unique ID of 111222 and a timestamp of 18:23:47.

Bank logs are used to determine the liable entity in the case the same currency is used more than once.

Of course it should be appreciated that this is only one example, and other information may be recorded or omitted, as desired.

Domain banks logs, not shown, are identical with exchange bank log 80, save the domain logs do not include the received foreign currencies log 89.

Accordingly, as described above, the inventive banking infrastructure is responsible for generating access rights, strictly controlling distribution of currency to obtain the access rights, and maintaining detailed logs for audit and liability purposes.

VIII. CONCLUSION

In conclusion, the present invention relates to enhancing security in an electronic system through the use of electronic security value units to control access to a particular resource.

Finally, the above described embodiments of the invention are intended to be illustrative only. Numerous alternative embodiments may be devised by those skilled in the art without departing from the spirit and scope of the following claims.

What is claimed is:

1. A method for detecting denial of service attacks on a resource in an electronic system, wherein access to the resource is based on payments in electronic security value units, comprising:
   detecting patterns of payments for the resource over a plurality of users in electronic security value units;
   comparing the patterns of payments to predetermined patterns of payment; and
   indicating a denial of service attack based upon the comparison of the patterns of payments to the predetermined patterns of payment.

2. The method of claim 1, wherein the comparing comprises determining a difference in the detected patterns of payments and the predetermined patterns of payment.

3. The method of claim 1, wherein the detected patterns of payments are payments incoming to the resource.

4. The method of claim 1, wherein the detected patterns of payments are detected irrespective of source.

5. The method of claim 1, wherein the plurality of users is all users.

6. The method of claim 1, wherein the resource is a set of resources.

7. The method of claim 1, wherein the resource is associated with a price.

8. The method of claim 1, wherein at least one of the plurality of users is associated with a budget.

9. The method of claim 1, wherein the resource is associated with a price and at least one of the plurality of users is associated with a budget.

10. The method of claim 9, further comprising deducting the price from a budget of an accessing user of the plurality of users in response to receiving a payment from the accessing user.

11. The method of claim 10, further comprising detecting that a budget is depleted and inhibiting access to the resource by a user associated with the depleted budget.

* * * * *

UNITED STATES PATENT AND TRADEMARK OFFICE
CERTIFICATE OF CORRECTION

| | | |
|---|---|---|
| PATENT NO. | : 7,272,855 B1 | Page 1 of 1 |
| APPLICATION NO. | : 09/589500 | |
| DATED | : September 18, 2007 | |
| INVENTOR(S) | : Yechiam Yemini et al. | |

It is certified that error appears in the above-identified patent and that said Letters Patent is hereby corrected as shown below:

In the Specification

On column 1, after line 3, please add:

-- STATEMENT REGARDING FEDERALLY SPONSORED RESEARCH OR DEVELOPMENT

This invention was made with government support under grant F30602-97-1-0252 by the Air Force Research Laboratory, Information Directorate. The Government has certain rights in this invention. --

Signed and Sealed this
Twenty-fourth Day of February, 2015

Michelle K. Lee
*Deputy Director of the United States Patent and Trademark Office*